US010291061B2

(12) United States Patent
Matoba

(10) Patent No.: US 10,291,061 B2
(45) Date of Patent: May 14, 2019

(54) CHARGER AND CHARGE CONTROL METHOD

(71) Applicant: Brother Kogyo Kabushiki Kaisha, Nagoya-shi, Aichi-ken (JP)

(72) Inventor: Kenji Matoba, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 40 days.

(21) Appl. No.: 15/719,661

(22) Filed: Sep. 29, 2017

(65) Prior Publication Data
US 2018/0278080 A1  Sep. 27, 2018

(30) Foreign Application Priority Data

Mar. 27, 2017 (JP) .................... 2017-060332

(51) Int. Cl.
*H02J 7/04* (2006.01)
*H02J 7/00* (2006.01)
*H02J 7/08* (2006.01)

(52) U.S. Cl.
CPC ............ *H02J 7/042* (2013.01); *H02J 7/0018* (2013.01); *H02J 7/0045* (2013.01); *H02J 7/0068* (2013.01); *H02J 7/082* (2013.01); *H02J 7/0036* (2013.01); *H02J 2007/0001* (2013.01); *H02J 2007/0096* (2013.01)

(58) Field of Classification Search
CPC .......... H02J 7/042; H02J 7/0018; H02J 7/082; H02J 7/0045; H02J 7/0068; H02J 2007/0001; H02J 7/0036; H02J 2007/0096

USPC ........................................................ 320/107
See application file for complete search history.

(56) References Cited

U.S. PATENT DOCUMENTS

| 4,553,081 A | * | 11/1985 | Koenck ................. G01R 31/36 320/131 |
| 5,563,493 A | | 10/1996 | Matsuda et al. |
| 7,199,556 B1 | * | 4/2007 | Benckenstein, Jr. . H02J 7/0016 320/112 |

(Continued)

FOREIGN PATENT DOCUMENTS

| JP | H06-253463 A | 9/1994 |
| JP | H07-322517 A | 12/1995 |

(Continued)

*Primary Examiner* — M Baye Diao
(74) *Attorney, Agent, or Firm* — Banner & Witcoff, Ltd.

(57) ABSTRACT

A charger mounting a rechargeable battery includes a switcher configured to switch transmission status of electric power through cables connected to an upstream port and/or downstream port, and a discharger configured to consume the electric power by discharging. The controller is configured to control, depending on charged quantity of the rechargeable battery and request information for feed/reception of the electric power, the switcher and the discharger to execute one of: at least one of charging the rechargeable battery with the electric power received from one of the power source, the upstream charger and the downstream charger through a cable, and consuming the electric power as received by the discharger; and at least one of transmitting the electric power of the rechargeable battery to one of the upstream charger and the downstream charger through a cable, and consuming the electric power of the rechargeable battery by the discharger.

14 Claims, 24 Drawing Sheets

(56) References Cited

U.S. PATENT DOCUMENTS

| | | | |
|---|---|---|---|
| 8,120,323 B2* | 2/2012 | Lai | H02J 7/022 |
| | | | 320/128 |
| 8,143,852 B2 | 3/2012 | Murao | |
| 8,860,378 B2* | 10/2014 | Pulijala | H02J 7/0009 |
| | | | 320/162 |
| 9,141,164 B2* | 9/2015 | Bailey | G06F 1/30 |
| 9,544,967 B2* | 1/2017 | Recker | H05B 33/0854 |
| 9,711,962 B2* | 7/2017 | Andrea | H02H 9/002 |
| 9,806,547 B2* | 10/2017 | Carre | H02J 7/0052 |
| 9,866,055 B2* | 1/2018 | Agarwal | H02J 7/007 |
| 9,923,393 B2* | 3/2018 | Workman | H02J 7/0045 |
| 10,112,501 B2* | 10/2018 | Ishibashi | H01M 10/44 |
| 2009/0085520 A1 | 4/2009 | Murao | |
| 2010/0165528 A1 | 7/2010 | Chan | |
| 2012/0074911 A1 | 3/2012 | Murao | |
| 2013/0069600 A1* | 3/2013 | Knowlton | H02J 7/008 |
| | | | 320/162 |
| 2014/0159662 A1* | 6/2014 | Furui | B25F 5/02 |
| | | | 320/112 |
| 2016/0006278 A1* | 1/2016 | Sakakibara | H02J 7/0019 |
| | | | 320/112 |
| 2016/0049813 A1* | 2/2016 | Takizawa | H01M 10/441 |
| | | | 320/112 |
| 2017/0271894 A1* | 9/2017 | York | H02J 7/0026 |
| 2017/0336844 A1* | 11/2017 | Koga | G06F 1/20 |

FOREIGN PATENT DOCUMENTS

| | | |
|---|---|---|
| JP | H10-285811 A | 10/1998 |
| JP | 2928431 B2 | 8/1999 |
| JP | 2006-101583 A | 4/2006 |
| JP | 2006-230055 A | 8/2006 |
| JP | 2008-123868 A | 5/2008 |
| JP | 2009-081981 A | 4/2009 |
| JP | 2010-165347 A | 7/2010 |
| JP | 2014-011911 A | 1/2014 |
| JP | 2015-174375 A | 10/2015 |

\* cited by examiner

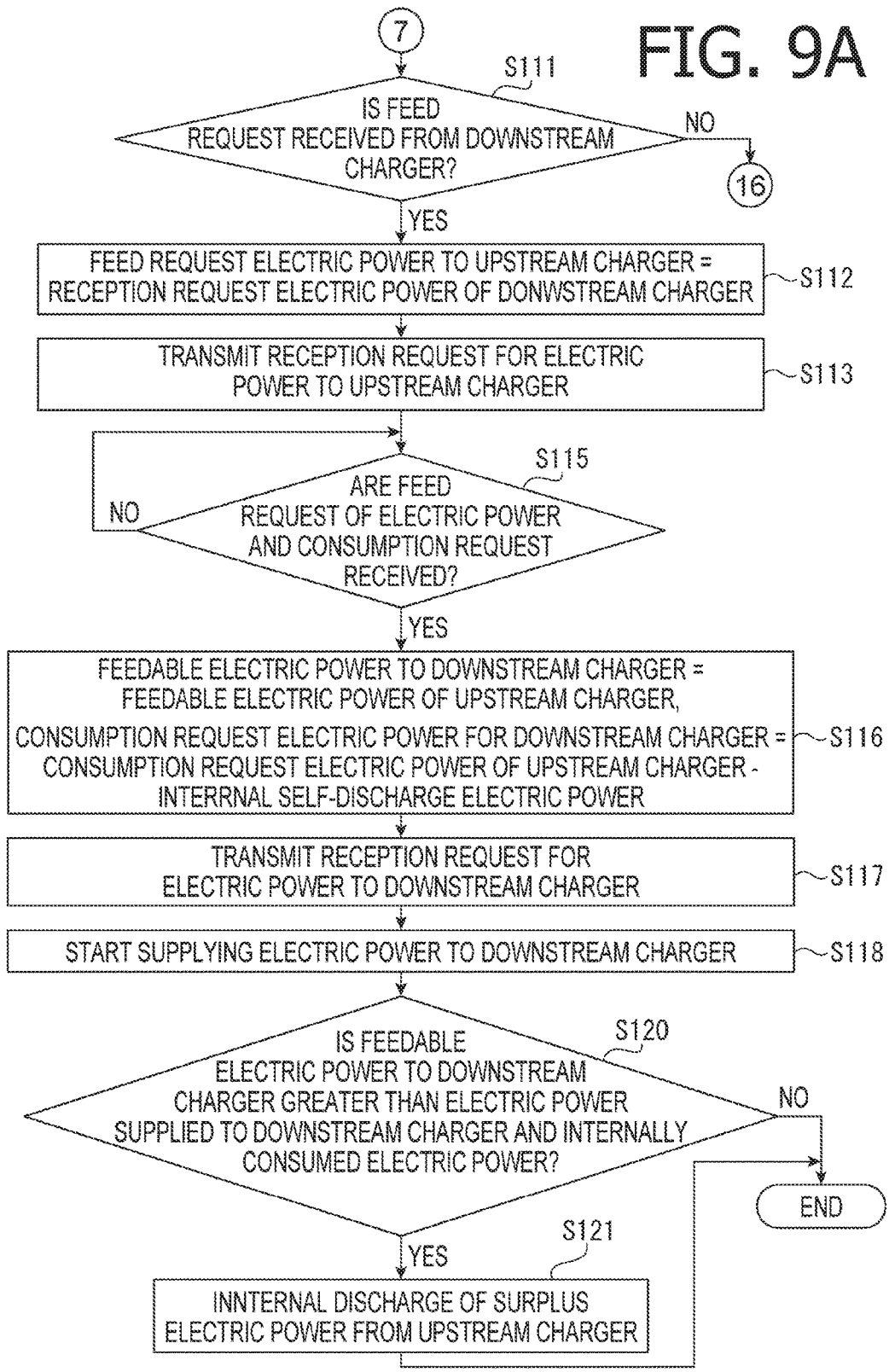

| CHARGER ID | RECHARGEABLE BATTERY | CAPACITY | TARGET QUANTITY | CHARGED QUANTITY | DISCHARGE CIRCUIT |
|---|---|---|---|---|---|
| 000D | AVAILABLE | 2000mAh | 30% | 50% | 5W |
| 000C | AVAILABLE | 2000mAh | 30% | 10% | 10W |
| 000B | AVAILABLE | 1000mAh | 30% | 70% | 10W |
| 000A | AVAILABLE | 2000mAh | 30% | 80% | 10W |

| CHARGER ID | CHARGE/DISCHARGE | CHARGE CONTROL | INTERNAL DISCHARGE | CONNECTION DESTINATION |
|---|---|---|---|---|
| 000D | FED | OFF | 000D | 000C |
| 000C | RECEIVE | ON | 000D | 000D |
| 000B | FED | OFF | 000B | NONE |
| 000A | FED | OFF | 000A | NONE |

CHARGER AND CHARGE CONTROL METHOD

CROSS-REFERENCE TO RELATED APPLICATIONS

This application claims priority under 35 U.S.C. § 119 from Japanese Patent Application No. 2017-060332 filed on Mar. 27, 2017. The entire subject matter of the application is incorporated herein by reference.

BACKGROUND

Technical Field

The present disclosures relate to a charger configured to charge a rechargeable battery, and a charge control method.

Related Art

There has been known a charging system in which multiple chargers are connected, with cables, in series, and an electric power is supplied from an AC adaptor which is connected to the most upstream side one of the multiple chargers. The electric power supplied to the most upstream side one of the multiple chargers is supplied to the remainder of the multiple charges sequentially, thereby batteries respectively mounted on the multiple chargers being charged collectively. The multiple chargers are interconnected with relay cables used to transmit/received the electric power and signal cables used to transmit/receive information related to charging. Each charger is configured to control charging of a rechargeable battery mounted thereon based on charging status of the chargers on the upstream side thereof, thereby a particular number of chargers which can charge the rechargeable batteries simultaneously being actuated to charge the rechargeable batteries.

SUMMARY

When, for example the rechargeable batteries are transported, or stored for a long-term, there is a case where the rechargeable battery should not be fully charged, but the quantity of the rechargeable battery is restricted to be particular quantity. In such a case, if the charged quantity of a rechargeable battery is larger than the particular quantity, it is desired that such a rechargeable battery is discharged. However, the conventional charging system as described above is not configured such that the chargers cannot discharge the batteries.

According to aspects of the disclosures, there is provided a charger, which includes a mounting part configured to mount a rechargeable battery, an acquisition part configured to acquire a charged quantity of the rechargeable battery mounted on the mounting part, a port part to which cables transmitting an electric power is connectable, a switcher configured to switch transmission status of the electric power through the cable, a discharger configured to consume the electric power by discharging, and a controller configured to control the switcher and the discharger based on the charged quantity acquired by the acquisition part. The charger is configured such that multiple chargers can be connected in series through the cables. The port part includes an upstream port and a downstream port, the upstream port being connectable with a power source or an upstream charger which is another charger of the multiple chargers arranged on the power source side through the cable, the downstream port being connectable with a downstream charger which is another charger of the multiple chargers arranged on a side farther from the power source. The cable is configured to transmit the electric power, the cable being further configured to transmit information among controllers of respective ones of the multiple chargers. The information includes request information which requests for feed/reception of the electric power with respect to the rechargeable battery depending on the charged quantity of the rechargeable battery. The controller is configured to control, depending on the charged quantity of the rechargeable battery and the request information, the switcher and the discharger to execute one of: at least one of charging the rechargeable battery with the electric power received from one of the power source, the upstream charger and the downstream charger through the cable, and consuming the electric power as received by the discharger; and at least one of transmitting the electric power of the rechargeable battery to one of the upstream charger and the downstream charger through the cable, and consuming the electric power of the rechargeable battery by the discharger.

According to aspects of the disclosures, there is provided a charge control method of controlling a charger, the charger having a mounting part configured to mount a rechargeable battery, an acquisition part configured to acquire a charged quantity of the rechargeable battery mounted on the mounting part, a port part to which cables transmitting an electric power is connectable, a switcher configured to switch transmission status of the electric power through the cable, a discharger configured to consume the electric power by discharging, and a controller configured to control the switcher and the discharger based on the charged quantity acquired by the acquisition part, the charger being configured such that multiple chargers can be connected in series through the cables, the port part including an upstream port and a downstream port, the upstream port being connectable with a power source or an upstream charger which is another charger of the multiple chargers arranged on the power source side through the cable, the downstream port being connectable with a downstream charger which is another charger of the multiple chargers arranged on a side farther from the power source, the cable being configured to transmit the electric power, the cable being further configured to transmit information among controllers of respective ones of the multiple chargers, the information including request information which requests for feed/reception of the electric power with respect to the rechargeable battery depending on the charged quantity of the rechargeable battery. The method causes the controller to control, depending on the charged quantity of the rechargeable battery and the request information, the switcher and the discharger to execute one of: at least one of charging the rechargeable battery with the electric power received from one of the power source, the upstream charger and the downstream charger through the cable, and consuming the electric power as received by the discharger; and at least one of transmitting the electric power of the rechargeable battery to one of the upstream charger and the downstream charger through the cable, and consuming the electric power of the rechargeable battery by the discharger.

BRIEF DESCRIPTION OF THE ACCOMPANYING DRAWINGS

FIGS. 7A-7C, 8A-8B, 9A-9B and 10A-10B show a flowchart illustrating an intermediate equipment process.

Figures 14A, 14B:

FIG. 14A schematically shows an equipment information table.

FIG. 14B schematically shows a charge/discharge table.

DETAILED DESCRIPTION OF ILLUSTRATIVE EMBODIMENT

Figure 1:
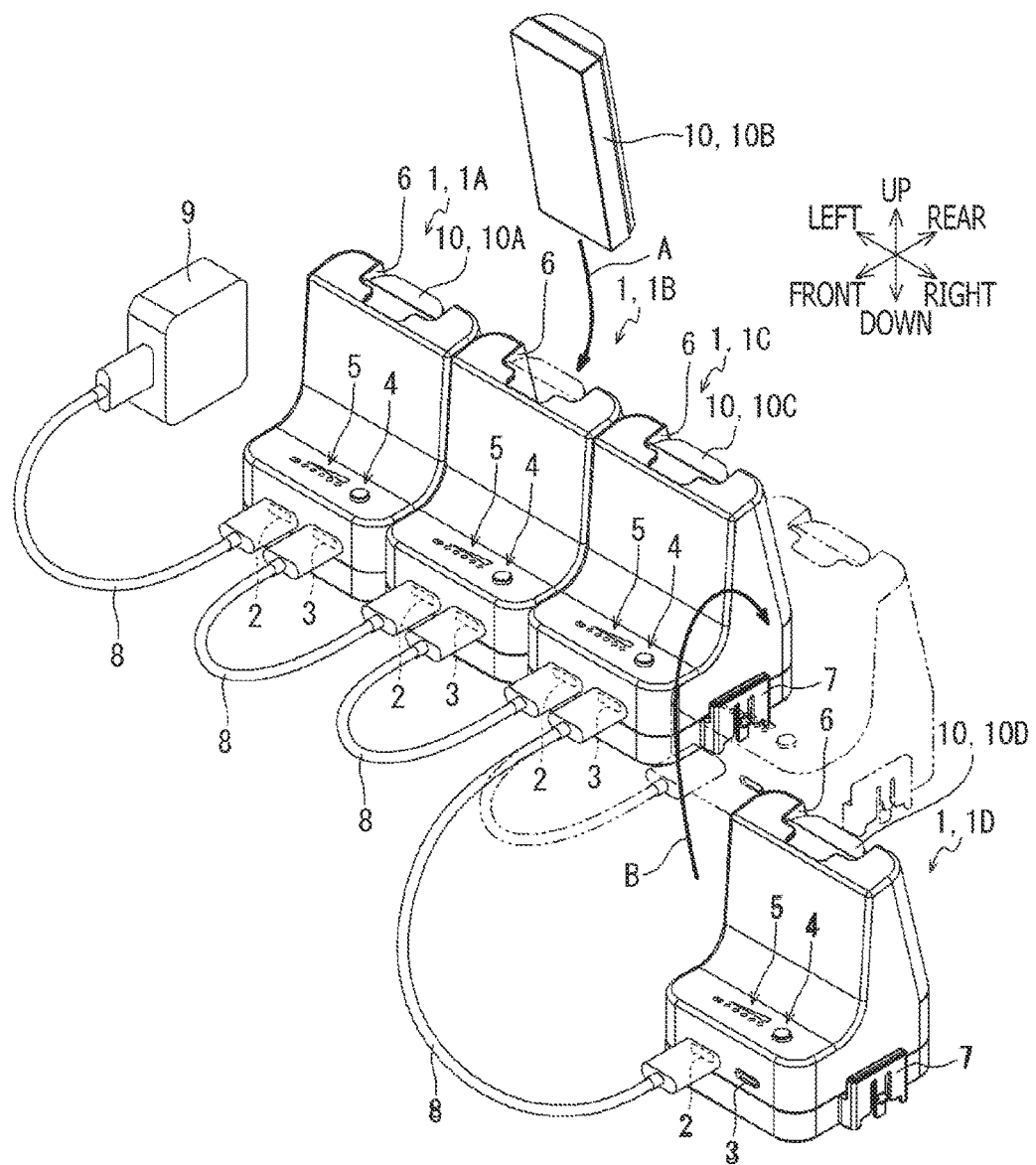
FIG. 1 is a perspective view of the chargers 1A-1D connected in series according to an illustrative embodiment of the present disclosures.

Hereinafter, referring to the accompanying drawings, an illustrative embodiment will be described. In the following description, directions (i.e., right, left, front, rear, up and down directions) indicated in the drawings will be referred to for describing directions. As shown in FIG. 1, the chargers 1A-1D are configured to charge rechargeable batteries 10A-10D, which are used in a portable printer, are detachably mounted on the chargers 1A-1D, respectively. The charges 1A-1D have substantially the same structure. In the following description, when the chargers 1A-1D are described generally or collectively, they are referred to as the charger(s) 1. The rechargeable batteries 10A-10D have the same structure, and will be referred to as rechargeable batteries (or battery) 10 when generally or collectively referred to.

The rechargeable battery has a shape of a rectangular parallelepiped extending in an up-down direction, and right and left edge portions, extending in the up-down direction, of a rear surface thereof are chamfered to exhibit curved surfaces. The rechargeable battery 10 is, for example, a lithium-ion secondary battery. The charger 1 is used alone with being connected to an AC adapter 9. Further, the multiple chargers 1 are connected with cables 8 and used to form a power-supplying line. Each cable 8 is provided with a connector based on a USB Type-C (registered trademark) standard, and supports USB PD, such that the connector is capable of transmitting electric power corresponding to the maximum 5 A electric current, and pieces of information.

The charger 1 receives the electric power from the AC adaptor 9 which is connected to a commercial plug socket (not shown). The charger 1 has a rectangular shape extending in the up-down direction when viewed from a front side, an L-shaped when viewed from a left side, and a rounded-rectangular shape when viewed from the up side. The charger 1 is configured such that two sets of ports 2 and 3, to which the cable 8 is to be connected, are provide on a front surface of its lower portion. Each of the ports 2 and 3 is a USB I/F based on the USB Type-C standard. The ports 2 and 3 are aligned on the front surface of the charger 1 in the right-left direction.

When the power supplying line is formed with multiple chargers 1, the left port 2 of each charger 1 serves to be connected with an equipment which supplies the electric power. In other words, the port 2 is used to connect the charger 1 with an equipment which is on the upstream side, along the power supplying line, with respect to itself. The equipment, which supplies the electric power to the charger 1, is the AC adaptor 9 or another charger 1 based on the USP PD and configured to execute a charge/discharge controlling process (see FIGS. 5A and 5B) or an equivalent process to charge/discharge the rechargeable battery 10. The right port 3 serves to be connected with an equipment which receives the electric power. That is, the port 3 is used to connect the charger 1 with an equipment which is on the downstream side, along the power supplying line, with respect to itself. The equipment, which receives the electric power from the charger 1, is another charger 1 based on the USP PD and configured to execute a charge/discharge controlling process or an equivalent process to charge/discharge the rechargeable battery 10.

The charger 1 has an operation part 4 and a display part 5 on an upper surface of a front portion thereof. The operation part 4 is, for example, a push switch and is operated to set an intended charged quantity (hereinafter, referred to as a target quantity) of the electric power to be stored (hereinafter, referred to as a charged quantity) in the rechargeable battery 10. In the illustrative embodiment, the charged quantity and the target quantity are represented by a ratio of the charged quantity with respect to the maximum electric power which can be stored in the rechargeable battery 10. The display part 5 is, for example, configured such that multiple LED's are aligned in the right-left direction, and indicates the target quantity with lighting, extinction, a pattern of blinking and/or colors in accordance with a user operation of the operation part 4.

The charger 1 has a mounting part 6 for mounting the rechargeable battery 10 on its rear surface. The mounting part 6 is formed to be a recessed part slightly larger than an outer shape of the rechargeable battery 10. The mounting part 6 substantially correspond to the outer shape of the rechargeable battery 10 when the rechargeable battery 10 is mounted thereon. Contacts electrically connecting a circuit substrate (not shown) of the charger 1 and the rechargeable battery 10 are provide on a lower part inside the mounting part 6. The circuit substrate is arranged inside a lower part of the charger 1. As indicated by an arrow A in FIG. 1, the rechargeable battery 10B is inserted in the mounting part 6 of the charger 1B from the upside on the rear side of the charger 1B. The other rechargeable batteries 10A, 10C and 10D are mounted on the mounting parts 6 of the chargers 1A, 1C and 1D, respectively, in a similar manner. When the rechargeable battery 10 is mounted on the mounting part 6, the contacts of the charger 10 contact contacts (not shown) of the rechargeable battery 10, and serve to supply the electric power to the mounted rechargeable battery 10.

The charger 1 has an engaging claw 7 on a right surface of its lower part, and an engaging recess (not shown) on a left surface of its lower part. As indicated by an arrow B in FIG. 1, the charger 1C can be mechanically connected with the charger 1D by inserting the engaging claw 7 of the charger 1C into the engaging recess of the charger 1D, which is arranged on the right side of the charger 1C, from below. Each of the other chargers 1A, 1B and 1D can be connected to another charger 1 in a similar manner.

Figure 2:
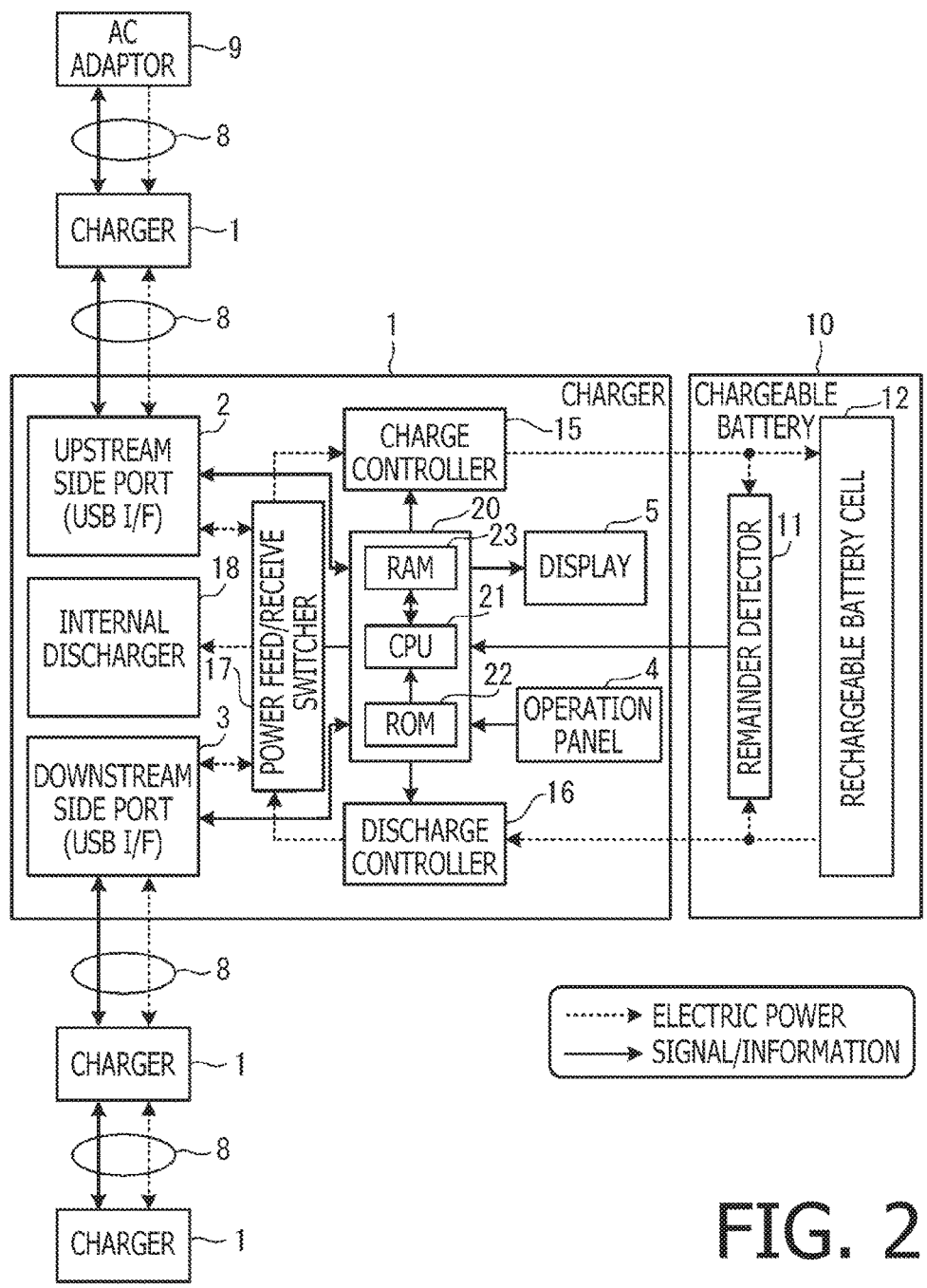
FIG. 2 is a block diagram showing an electric configuration of the charger shown in FIG. 1.

Referring to FIG. 1, an electric configuration of the charger 1 will be described. It is noted that, in FIG. 2, flow of the electric power among respective parts is indicated by dotted lines, and flow of information and signals among respective parts is indicated by solid lines. The circuit substrate of the charger 1 has a controller 20, the operation part 4, the display part 4, the ports 2 and 3, a charge controller 15, a discharge controller 16, a power feed/receive switcher 17, an internal discharger 18, mounted thereon. The controller 20 is a microcomputer provided with a CPU 21, a ROM 22 and a RAM 23. The controller 20 operates with the electric power supplied by the AC adaptor 9 connected to the port 2, directly or indirectly through other charger(s) 1. The CPU 21 controls charging/discharging of the rechargeable battery 10, and executes computational operations and processes regarding charging/discharging in accordance with programs stored in the ROM 22. The ROM 22 stores initializing parameters as well as the programs. The RAM 23 temporarily stores results of the computational operations by the CPU 21, pointers, counters and the like. The operation part 4 and the display part 5 are connected to the microcomputer. The operation part 4 acquires input-operations by the user with respect to the push switch such as depression, long-depression and the like. The display part 5 controls, in accordance with instruction by the CPU 21, lighting, extinction, blinking of the LED's in accordance with patterns and colors designated by the CPU 21.

The controller 20 is electrically connected to the ports 2 and 3, the charge controller 15, the discharge controller 16, and the power feed/receive switcher 17. The charge controller 15 controls the electrical power supplied to a battery cell 12 contained in the rechargeable battery 10 mounted on the charger 1 in accordance with the instruction by the CPU 12. The discharge controller 16 controls the electric power supplied from the battery cell 12 in accordance with the instruction by the CPU 21. When the battery cell 12 is charged, the CPU 21 drives the charge controller 15, while does not drive the discharge controller 16. When the battery cell 12 is discharged, the CPU 21 drives the discharge controller 16, and does not drive the charge controller 15. The power feed/receive switcher 17 switches electrical connection states among the ports 2 and 3, the charge controller 15, the discharge controller 16, and the discharger 18. The internal discharger 18 is a circuit which consumes the electric power stored in the battery cell 12 by applying a constant current load to the battery cell 12 with, for example, a well-known constant current circuit. The discharger 18 can be electrically connected to the battery cell 12 of another rechargeable battery 10 mounted on another charger 1 through the ports 2 and 3 by switching the connection states with the power feed/receive switcher 17, thereby discharging being performed.

The rechargeable battery 10 contains the battery cell 12, a control circuit (not shown) managing the voltage of the battery cell 12, a protective circuit (not shown) configured to protect the battery cell 12 from overcharging/overdischarging. The control circuit includes a remainder detector 11. The remainder detector 11 continuously measures a voltage, a current and a temperature to calculate an impedance of the battery cell 12, and the charged quantity. When the rechargeable battery 10 is mounted to the charger 1, the CPU 21 of the charger 1 can obtain the charged quantity of the battery cell 12 from the remainder detector 11.

Although not shown in the drawings, the charger 1 has a detection circuit which detects a connection status of the AC adaptor 9 and/or another charger 1 connected to the ports 2 and 3 through the cables 8. When the AC adapter and/or another charger 1 is connected to the ports 2 and 3 through the cables 8, the detection circuit outputs a connection signal indicating a connected state, for each port, to the CPU 21. Therefore, the CPU 21 is capable of detecting change of connection states of the AC adaptor and/or another charger 1 with respect to the charger 1.

Further, the charger 1 is provided with a battery detection circuit (not shown) detecting a connection state of the rechargeable battery 10 to the charger 1. The battery detection circuit outputs a mount signal indicating a mounted state to the CPU 21 when the rechargeable battery 10 is mounted to the mounting part 6 and is in a chargeable or dischargeable state. Therefore, the CPU 21 is capable of detecting a change of mounting state of the rechargeable battery on the mounting part 6 based on the state of the mount signal.

As shown in FIG. 1, the charger 1 is configured such that multiple chargers 1 can be electrically connected in series. According to the illustrative embodiment, an example where four chargers 1A-1D are electrically connected in series will be described. The cable 8 connected to the port 2 of the charger 1A is connected to the AC adaptor 9, and the cable 8 connected to the port 3 of the charger 1A is connected to the port 2 of the charger 1B. The charger 1A is arranged on the most upstream side, along the power supplying line, and will also be referred to as an upstream end equipment in the following description. The cable 8 connected to the port 2 of the charger 1D is connected to the port 3 of the charger 1C, while the port 3 of the charger 1D is not connected to any equipment. The charger 1D is arranged on the most downstream side, along the power supplying line, and will also be referred to as a downstream end equipment in the following description. The cable 8 connected to the port 2 of the charger 1B is connected to the port 3 of the charger 1A, and the cable 8 connected to the port 3 of the charger 1B is connected to the port 2 of the charger 1C. Further, the cable 8 connected to the port 2 of the charger 1C is connected to the port 3 of the charger 1B, and the cable 8 connected to the port 3 of the charger 1C is connected to the port 2 of the charger 1D. The chargers 1B and 1C are equipment arranged between the upstream end equipment and the downstream end equipment, along the power supplying line, and will also be referred to as intermediate equipment in the following description. It is noted that the charger 1 which is connected to the AC adapter 9, but not connected to any other equipment will also be referred to as a stand-alone equipment in the following description.

Next, the operation of the charger 1 will be generally described. The CPU 21 of the charger 1 is actuated when connected with the power supplying line, and executes a charge/discharge controlling process (see FIGS. 5A and 5B). The charge/discharge controlling process is a process to charge or discharge the rechargeable battery 10 mounted on the charger 1 efficiently to adjust the charged quantity to meet the target quantity. The multiple chargers 1 connected to the power supplying line are configured mutually transmit the electric power of the rechargeable batteries 10 mounted thereon, respectively, thereby achieving efficient adjustment of the charged quantities. It is noted that the target quantity is assumed to be a particular quantity (e.g., 30%) according to the illustrative embodiment. However, this quantity may be defined to be a particular range (e.g., 27%-33%).

In the charge/discharge controlling process, the CPU 21 of the chargers 1 determine at which locations along the power supplying line the chargers 1 are connected, and executes suitable processes according to the determined locations, respectively. Specifically, the CPU 21 communicates with the equipment connected with the ports 2 and 3, and determines whether the equipment based on the same standard, which can executes the charge/discharge controlling process), is connected. The CPU 21 of the charger regards, among the chargers 1 connected to the power supplying line, chargers 1 located (i.e., connected to the power supplying line) on a power source side (i.e., the AC adaptor side) as the equipment (i.e., a source) that supplies the electric power to the rechargeable battery 10 mounted on the charger 1. Further, the CPU 21 of the charger regards, among the chargers 1 connected to the power supplying line, chargers 1 located (i.e., connected to the power supplying line) on a side opposite to the power source, with respect to the charger 1 corresponding to the CPU 21 itself, as the equipment (i.e., a sink) to which the electric power is transmitted from the charger 21 of itself. It is noted that, in the charge/discharge controlling process, when the rechargeable battery is inserted/removed, when the equipment configuring the power supplying line has been changed, or the charged quantity of the rechargeable battery 10 has reached the target quantity, respective processes are restarted from the beginning.

The charger 1D which is connected to the downstream end of the power supplying line transmits a power reception request of a swap request to the charger 1C in accordance with the charged quantity of the rechargeable battery 10D to the charger 10C, which is located on the upstream side with respect to the charger 1D. When the charged quantity of the rechargeable battery 10D is less than the target quantity, the charger 1D transmits the power reception request to the charger 1C located on the upstream side with respect to the charger 1D. When the charged quantity of the rechargeable battery 10D is greater than the target quantity, the charger 1D transmits the swap request to the charger 1C on the upstream side with respect to the charger 1C.

The power reception request is information requesting the upstream charger 1 for transmission of the electric power in order to receive the electric power form the upstream charger 1 and charge the rechargeable battery mounted on the charger 1 when the charged quantity of the rechargeable battery 10 is equal to or less than the target quantity. It is noted that, when the charged quantity of the rechargeable battery 10 is equal to the target quantity, the charger 1 transmits the power reception request of 0 W. The swap request is information requesting the upstream charger 1 for transmission of 0 W when the charged quantity of the rechargeable battery 10 is equal to the target quantity. That is, the swap request is information requiring a swapping process to swap the power supplying side charger 1 for the power receiving charger 1. When the upstream charger 1 accepts the swap request, the upstream charger 1 sets the port 3 as a port connected to the power supplying side charger 1, and the port 2 as a port connected to the power receiving side charger 1.

The charger 1C which located at an intermediate position along the power supplying line and located on the upstream side with respect to the charger 1D determines its function based on the charged quantity of the rechargeable battery 10C, and the power reception request of the swap request transmitted from the charger 1D. When the charged quantity of the rechargeable battery 10C is less than the target quantity, the charger 1C accepts the swap request if the swap request is received from the charger 1D, and transmits the power reception request to the upstream charger 1B if the power reception request is received from the charger 1D. When the charged quantity of the rechargeable battery 10C is greater than the target quantity, the charger 1D denies the swap request and transmits the swap request to the upstream charger 1B if the swap request is received from the charger 1D, while transmits a power feed request and a power consumption request to the charger 1D if the power reception request is received from the charger 1D, and supplies the electric power to the charger 1D.

The power feed request is information indicating a specification of the electric power which can be supplied to the downstream charger 1 when the charged quantity of the rechargeable battery 10 mounted on the charger 1 is greater than the target quantity. The charger 1 indicates the specification of the electric power that can be supplied to the downstream charger 1 with use of a USB PD profile, and transmits the power feed request. Although detained description on the USB PD profile is omitted since it is well-known, it is noted that the USB PD profile is information indicating a combination of a feedable voltage value and a feedable current value. The USB PD profile includes five steps of profiles. For example, a second profile indicates a combination of 5 V@2 A, and a combination of 12 V@1.5 A, and a fifth profile indicates a combination of 5 V@2 A, a combination of 12 V@5 A, and a combination of 20 V@5 A. The power feeding side charger 1 transmits, to the power receiving side charger 1, a profile indicating a combination of a voltage value and a current value, which is less than the maximum electric power the rechargeable battery 10 mounted on the power feeding side charger 1 can output. The power receiving side charger 1 selects a combination suitable for charging the rechargeable battery 10 mounted on the power receiving side charger 1 from among the combinations of the voltage value and the current value indicated by the power feed request, and receives the electrical power from the power feeding side charger 1.

The power consumption request is information indicating the electrical power to be consumed, in order to reduce the charged quantity to the target quantity, when the charged quantity of the rechargeable battery 10 is greater than the target quantity. The charger 1 is configured to consume the surplus electric power of the rechargeable battery 10 mounted thereon with the internal discharger 18 and the discharger 18 of the power receiving side charger 1. The electric power indicated by the power consumption request is the electric power calculated by subtracting the electrical power consumable by the internal discharger 18 from the maximum electric power the rechargeable battery 10 mounted on the power feeding side charger 1 can output. The power receiving side charger 1 can consume the electric power, which is calculated by subtracting the electric power consumed by charging of the rechargeable battery 10 mounted on the power receiving side charger 1 from the electric power indicated by the power consumption request, by the internal discharger 18 of the power receiving side charger 1. It is noted that the swap request includes the power feed request and the power consumption request.

The charger 1B which located at an intermediate position along the power supplying line and located on the upstream side with respect to the charger 1C determines, similarly to the charger 1C, its function based on the charged quantity of the rechargeable battery 10B, and the power reception request of the swap request transmitted from the charger 1C. When the charged quantity of the rechargeable battery 10B is less than the target quantity, the charger 1B accepts the swap request if the swap request is received from the charger 1C, while transmits the power reception request to the upstream charger 1A if the power reception request is received from the charger 1C. When the charged quantity of the rechargeable battery 10B is greater than the target quantity, the charger 1B denies the swap request and transmits the swap request to the upstream charger 1A if the swap request is received from the charger 1C, while transmits a power feed request and a power consumption request to the charger 1C if the power reception request is received from the charger 1C, and supplies the electric power to the charger 1C.

The charger 1A which located at the most upstream side end along the power supplying line determines its function based on the charged quantity of the rechargeable battery 10A, and the power reception request of the swap request transmitted from the charger 1B. When the charged quantity of the rechargeable battery 10A is less than the target quantity, the charger 1A accepts the swap request if the swap request is received from the charger 1B, while transmits the electric power received from the AC adaptor 9 to the charger 1B with the charger 1A itself receiving the electric power from the AC adaptor 9. When the charged quantity of the rechargeable battery 10A is greater than the target quantity, the charger 1A denies the swap request if the swap request is received from the charger 1B, while supplies the electric power to the charger 1B if the power reception request is received from the charger 1B.

Hereinafter, a concrete example of charging/discharging of the rechargeable battery 10 by the charger 1 will be described. In the following description, the target quantity of the rechargeable battery 10 is assumed to be 30% when the maximum charged quantity of the rechargeable battery 10 is 100%, for the sake of description. In the following description, the internal dischargers 18 of the chargers 1A-1D are indicated as the internal discharging portions 18A-18D, respectively, in order to distinguish the same from each other. Further, in FIGS. 3A-3D and 4A-4C, the discharger 18 is indicated in an abbreviated manner by a letter "D".

Figure 3A:
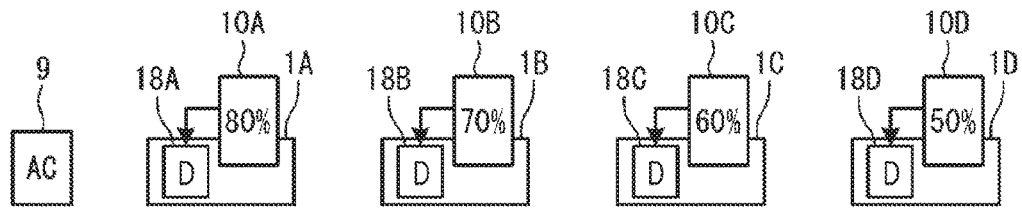
FIGS. 3A-3D illustrate a charging operation of a first example.

Referring to FIGS. 3A-3D, a first exemplary case where the charged quantity of each of the rechargeable batteries 10A-10C is 30% or more. As shown in FIG. 3A, since the charged quantity of each of the chargers 1B-1D is greater than the target quantity, the chargers 1B-1D transmit the swap request to the upstream chargers 1A-1C, but the requests are denied, respectively. Therefore, the chargers 1B-1D consume the electric power of the rechargeable batteries 10B-10D by the internal dischargers 18B-18D, respectively. Further, the charger 1A consumes the electric power of the rechargeable battery 10A by the internal discharger 18A.

Figure 3B:
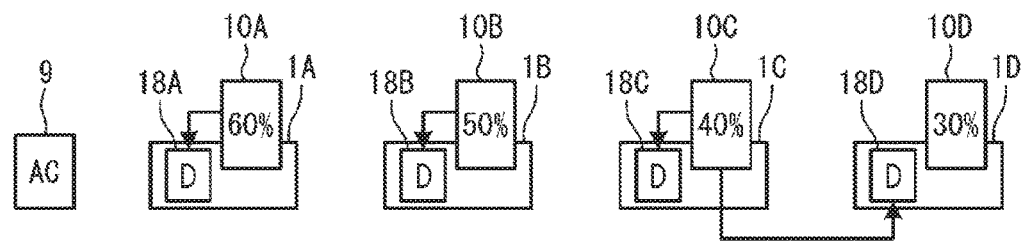
Figure 3C:
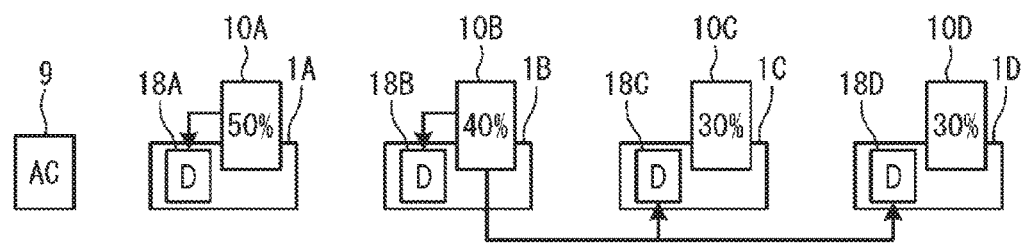
Figure 3D:
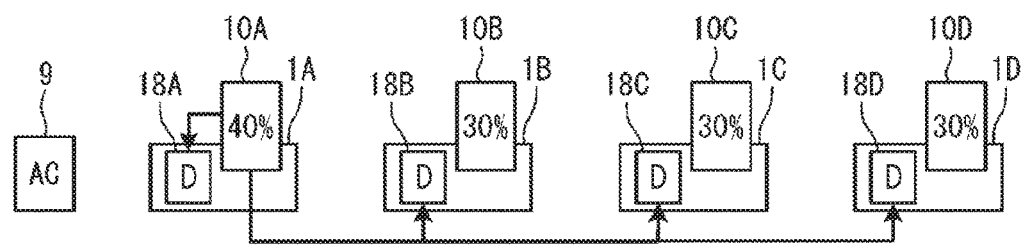

As shown in FIG. 3B, when the charged quantity of the rechargeable battery 10D has reduced and reached the target quantity, the charger 1D consumes the surplus electric power of the rechargeable battery 10C mounted on the upstream charger 1C by the internal discharger 18D of the charger 1D. When the charged quantity of the rechargeable battery 19C has reached the target quantity as shown in FIG. 3C, the chargers 1C and 1D consume the surplus electric power of the rechargeable battery 10B mounted on the upstream charger 1B by the internal dischargers 18C and 18D. When the charged quantity of the rechargeable battery 18B has reached the target quantity as shown in FIG. 3D, the chargers 1B-1D consume surplus electric power of the rechargeable battery 10A mounted on the upstream charger 1A by the internal dischargers 18B-18D.

Figure 4A:
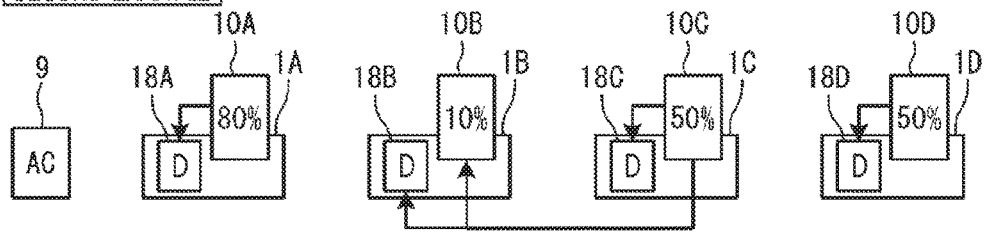
FIGS. 4A-4C illustrate charging operations of a second example, a third example, and a fourth example of the charging operations.

Next, referring to FIG. 4A, a second exemplary case where the charged quantity of each of the rechargeable batteries 10A, 10C and 10D is more than 30%, while the charged quantity of the rechargeable battery 10B is less than 30% will be describe. Since the charged quantity of each of the rechargeable batteries 10C and 10D is more than the target quantity, the charges 1C and 1D transmit the swap requests to the upstream chargers 1B and 1C, respectively. Since the swap request transmitted by the charger 1D is denied, the charger 1D consumes the electric power of the rechargeable battery 10D by the internal discharger 18D. Since the charged quantity of the rechargeable battery 10B is less than the target quantity, the charger 1B and the charger 1C execute the swapping process. Thus, the chargers 1B and 1C operate such that the rechargeable battery 10B is charged using the electric power of the rechargeable battery 10C, and the surplus electric power of the rechargeable battery 10C is consumed by the internal dischargers 18B and 18C. Further, the charger 1A consumes the electric power of the rechargeable battery 10A by the internal discharger 18A.

Figure 4B:
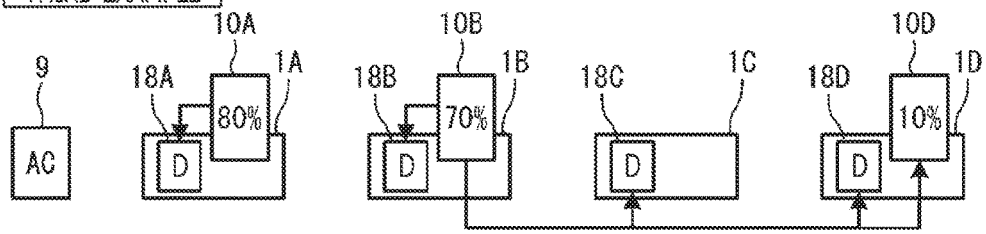

Next, referring to FIG. 4B, a third exemplary case where the charged quantity of each of the rechargeable batteries 10A and 10B is more than 30%, the rechargeable battery 10C is not available, and the charged quantity of the rechargeable battery 10D is less than 30% will be described. Since the charged quantity of the rechargeable battery 10D is less than the target quantity, the charger 1D transmits the power reception request to the upstream charger 1C. Since the charger 1C does not mount the rechargeable battery 10C, the charger 1C transmits, to the upstream charger 1B, the power reception request to which the electric power the required by the charger 1D is set. The charger 1B charges the rechargeable battery 10D with the electric power of the rechargeable battery 10B based on the power reception request. Further, the surplus electric power of the rechargeable battery 10B is consumed by the internal dischargers 18B-18D. Furthermore, the charger 1A consumes the electric power of the rechargeable battery 10A by the discharger 18A.

Figure 4C:
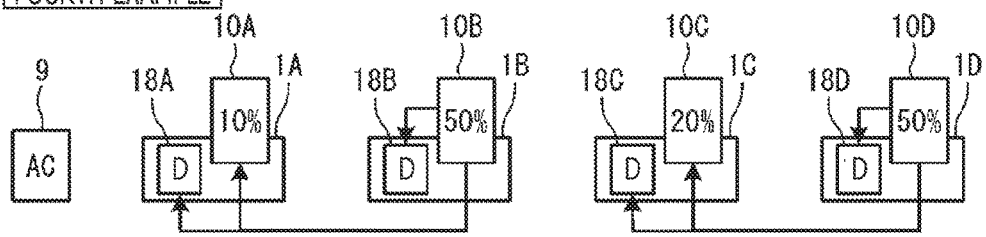

Next, referring to FIG. 4C, a fourth exemplary case where the charged quantity of each of the rechargeable batteries 10B and 10D is more than 30%, while the charged quantity of each of the rechargeable batteries 10A and 10C is less than 30% will be described. Since the charged quantity of each of the rechargeable batteries 10B and 10D is more than the target quantity, the chargers 1B and 1D transmit the swap requests to the upstream chargers 1A and 1C, respectively. Since the charged quantity of each of the rechargeable batteries 10A and 10C is less than the target quantity, the chargers 1A and 1C accept the swap requests transmitted from the chargers 1B and 1D, respectively. Then, the chargers 1A and 1B operate such that the rechargeable battery 10A is charged with the electric power of the rechargeable battery 10B, and the surplus electric power of the rechargeable battery 10B is consumed by the internal discharging portions 18A and 18B. Similarly, the chargers 1C and 1D operate such that the rechargeable battery 10C is charged with the electric power of the rechargeable battery 10D, and the surplus electric power of the rechargeable battery 10D is consumed by the internal discharging portions 18C and 18D.

Next, referring to FIGS. 5A-12, operations of the charger 1 will be described in detail. When the CPU 21 of the charge 1 is connected to the power supplying line and powered on, the CPU 21 retrieves a program for the charge/discharge controlling process stored in the ROM 22 and executes the same.

Figure 5A:
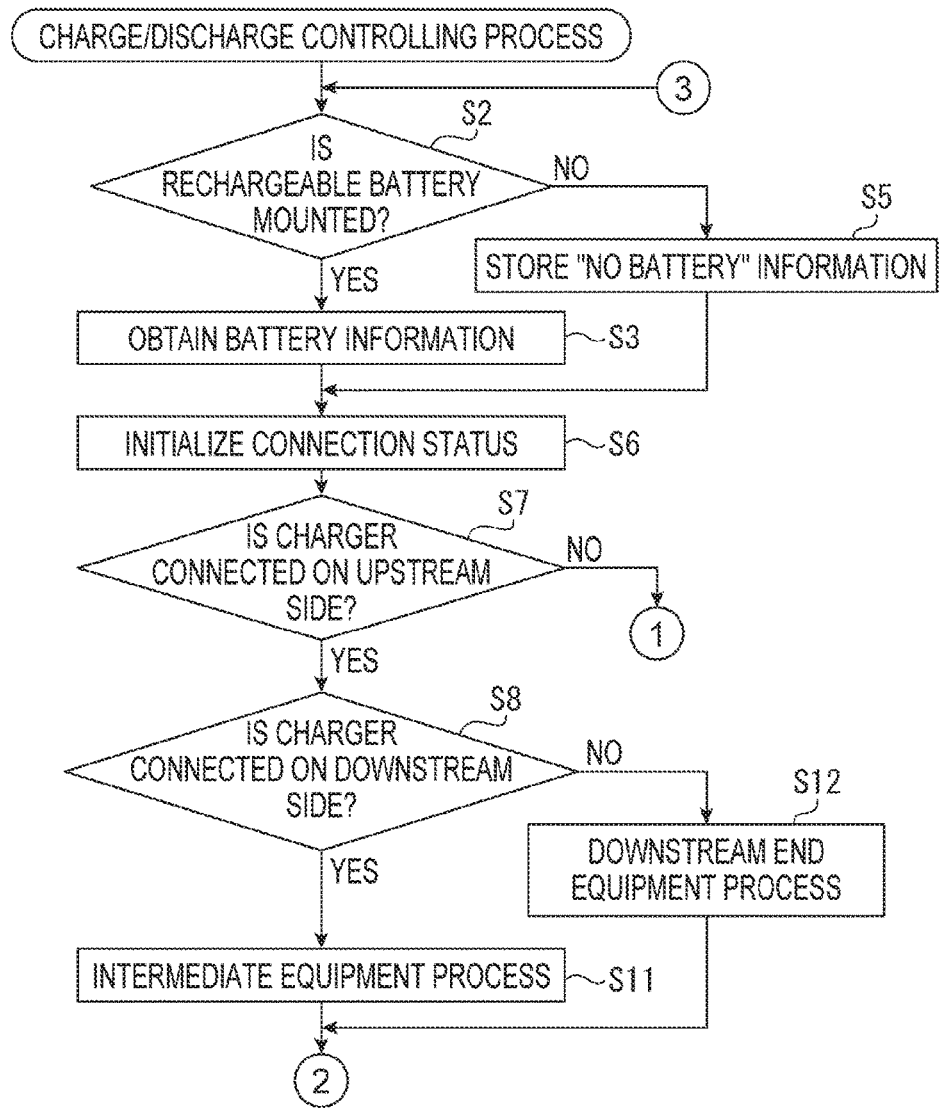
FIGS. 5A and 5B show a flowchart illustrating a charge/discharge controlling process according to the illustrative embodiment.
Figure 5B:
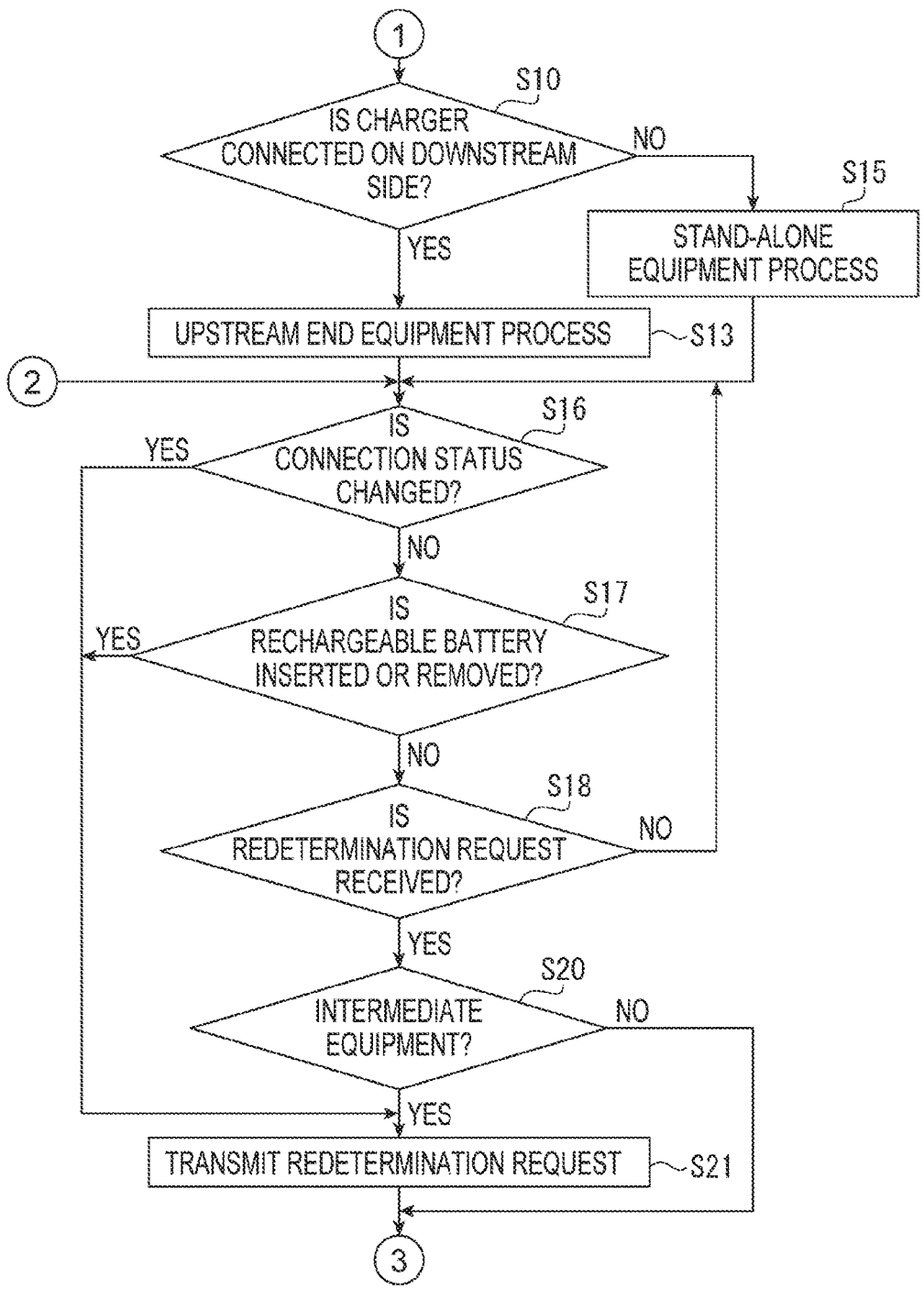

As shown in FIGS. 5A and 5B, in the charge/discharge controlling process, the CPU 21 determines whether the rechargeable battery 10 is mounted on the mounting part 6 based on the status of the mount signal (S2). When it is determined that the rechargeable battery 10 is mounted on the mounting part 6 (S2: YES), the CPU 21 obtains the charged quantity and the specification of the battery cell 12 from the remainder detector 11 as battery information, and stores the same in the RAM 23 (S3). The specification of the battery cell 12 is information indicating the maximum electric power the battery cell 12 can output when discharged (hereinafter, referred to as a maximum output electric power), and the electric power to be supplied to the battery cell 12 when charged (hereinafter, referred to as charging electric power). When the rechargeable battery 10 is not mounted on the mounting portion 6 (S2: NO), the CPU 21 stores information indicating the rechargeable battery 10 is not available in the RAM 23 (S5).

Next, the CPU 21 execute initialization of the connection status, thereby releasing the connections of ports 2 and 3 by the power feed/receive switcher 17, the internal discharger 18, the charge controller 15, the discharge controller 16 (S6). With this control, when the swapping state has been set, the swapping state is released. Further, when the electric power is received from another charger 1, the electric power receiving state is released. When the electric power is being supplied to another charger, the electric power supplying state is released. When the rechargeable battery 10 is being discharged by the internal discharging portion 18, the discharging state is released.

The CPU 21 executes a communication with the equipment connected to the ports 2 and 3. When another equipment based on the standard similar to the charger 1 is based and capable of executing a discharge controlling process (hereinafter, referred to as another charger 1) is connected to the upstream side port 2, and another charger 1 is connected to the downstream side port 3 (S7: YES; S8: YES), the CPU 21 determines that the charger 1 corresponding to the CPU 21 itself is the intermediate equipment, and executes an intermediate equipment process (see FIGS. 7A-7C) (S11). When another charger 1 is connected to the upstream side port 2, but another charger 1 is not connected to the downstream side port 3 (S7: YES; S8: NO), the CPU 21 determines the charger 1 is the downstream end equipment, and executes a downstream end equipment process (see FIGS. 6A and 6B) (S12). When another charger 1 is not connected to the upstream side port 2, while another charger 1 is connected to the downstream side port 3 (S7: NO; S8: YES), the CPU 21 determines that the charger 1 is the upstream end equipment and executes an upstream end equipment process (see FIGS. 11A-11C) (S13). When another charger 1 is not connected to the upstream side port 2, and another charger 1 is not connected to the downstream side port 3 (S7: NO; S8: NO), the CPU 21 determines that the charger 1 is a stand-alone equipment, and execute a stand-along equipment process (not shown) (S15). It is noted that a caser where the AC adaptor 9 is connected to the port 2, or a case where equipment based on a different standard is connected to the port 2 or 3 corresponds to a case where another charge 1 is not connected to the port 2 or 3.

The CPU 21 executes a process from S16-S21 in parallel with one of the intermediate equipment process, the downstream end equipment process, the upstream end equipment process or the stand-alone equipment process. The CPU 21 detects availability of the connection status with the AC adaptor 9 or another charger 1 based on the status of the connection signal (S16). When the connection state with other equipment has changed (S16: YES), the CPU 21 transmits redetermination request to another charger 1 connected to each of the ports 2 and 3 (S21), and returns the process to S2. The redetermination request is information requesting the CPU 21 of another charger 1 to execute the charge/discharge controlling process from the beginning.

When the connection state with other equipment has not been changed (S16: NO), the CPU 21 detects whether the mounting state at the mounting part 6 has been changed, that is, whether the rechargeable battery 10 has been inserted/removed, based on the state of the mount signal (S17). When the mounting state of the rechargeable battery 10 has been changed (S17: YES), the CPU 21 transmits the redetermination request to other equipment connected to the ports 2 and 3 (S21), ant returns the process to S2.

When the mounting state of the rechargeable battery 10 has not been changed (S17: NO), the CPU 21 determines whether the redetermination request is received from another charger 1 (S18). When it is determined that the redetermination request has been received from another charger 1 (S18: YES), the CPU 21 determines whether the charger 1 corresponding to the CPU 21 is the intermediate equipment (S20). When it is determined, during S7-S10, that the charger 1 corresponding to the CPU 21 is the intermediate equipment (S20: YES), the CPU 21 transmits the redetermination request to another charger 1 connected to the port opposite to the port through which the redetermination request from another charger 1 has been received (S21), and returns the process to S2. When it is determined that the charger 1 corresponding to the CPU 21 is not the intermediate equipment (S20: NO), the CPU 21 returns the process to S2.

When it is determined that the redetermination request is not received from another charger 1 (S18: NO), the CPU 21 returns the process to S16, and executes one of the intermediate equipment process, the downstream end equipment process, the upstream end equipment process and the stand-alone equipment process with executing, in parallel, the determining steps of S16-S18.

Figure 6A:
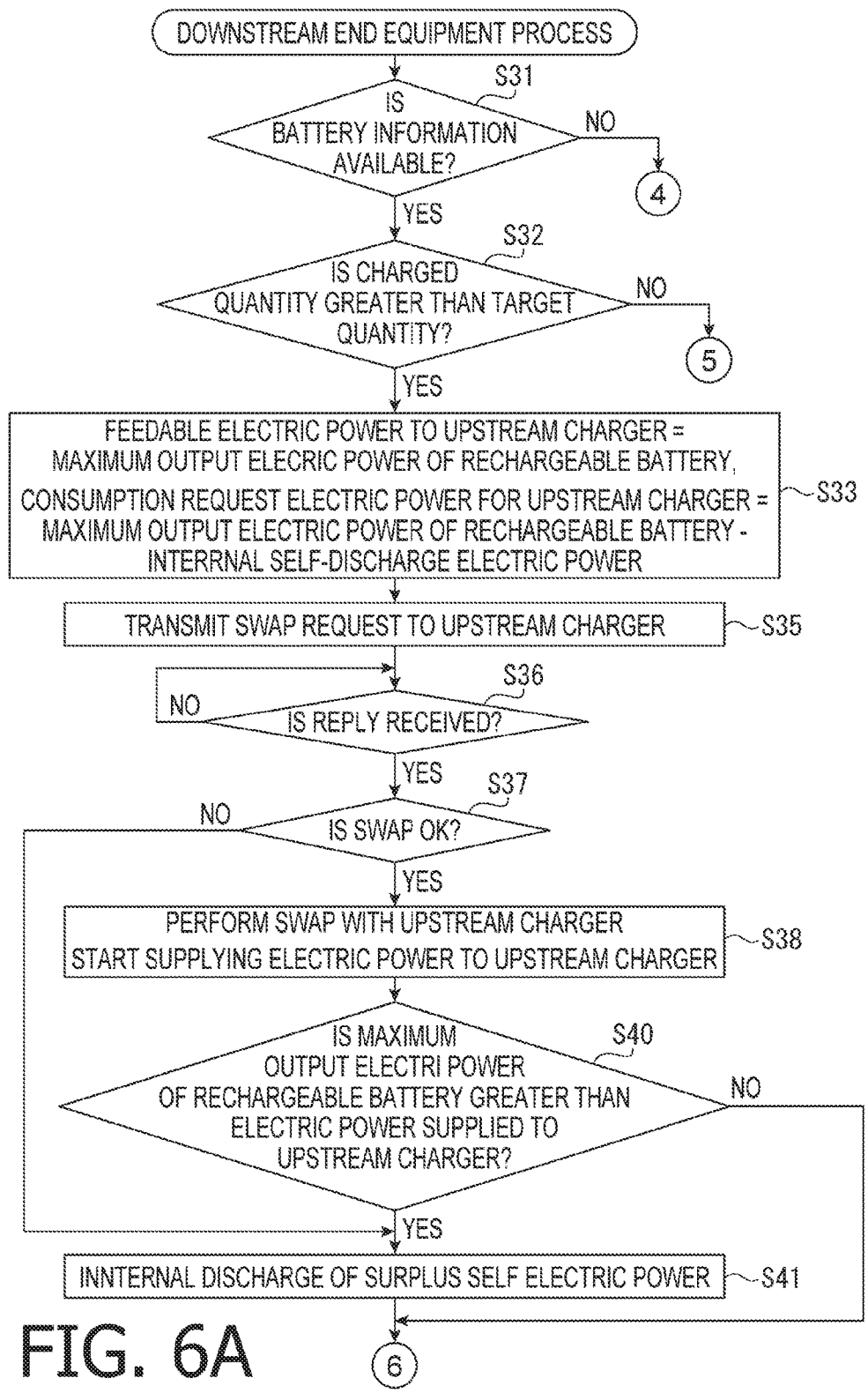
FIGS. 6A and 6B show a flowchart illustrating a downstream end equipment process.
Figure 6B:
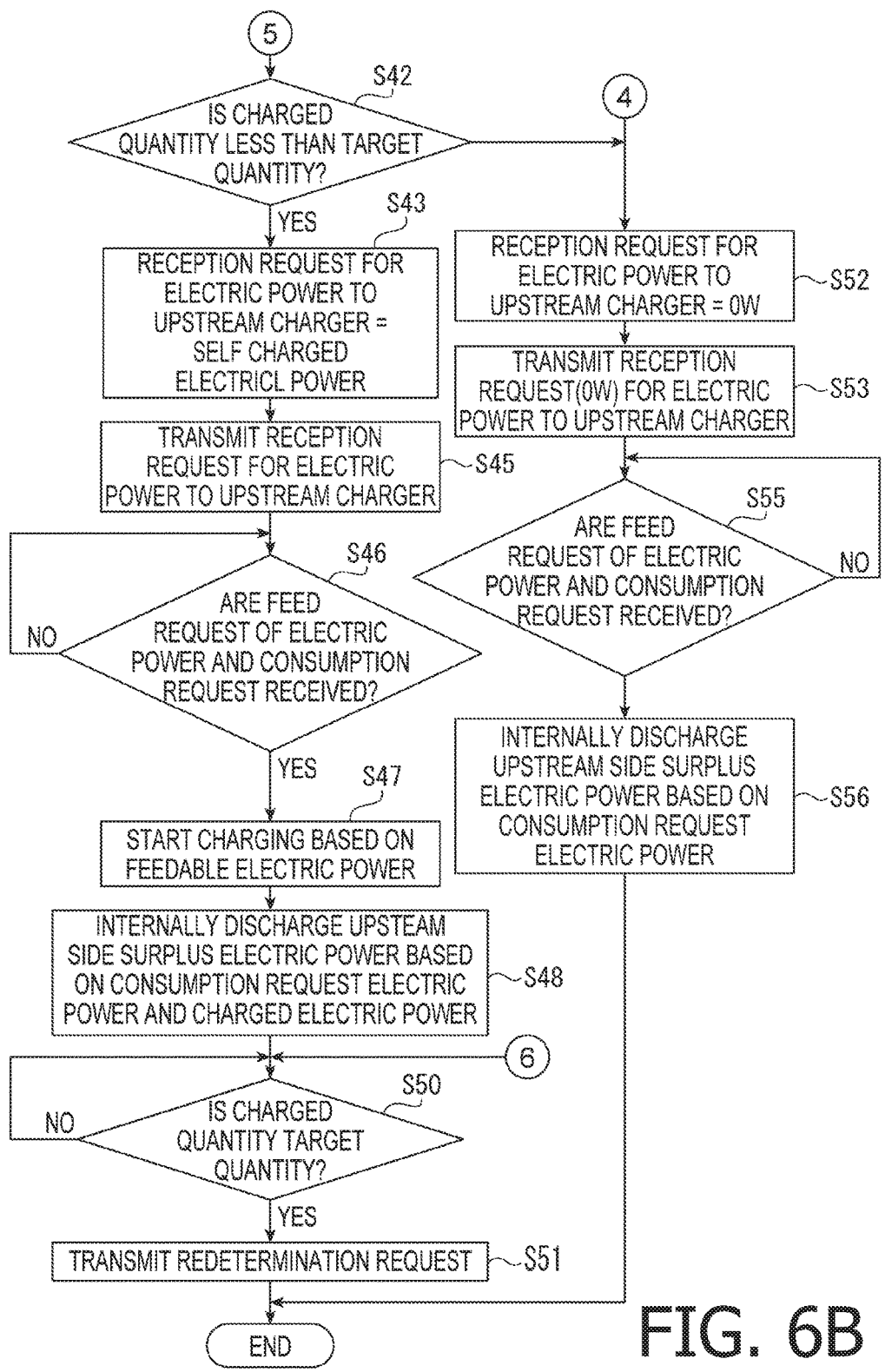

Next, using an operation executed by the CPU 21 of the charger 1D as an example, the downstream end equipment process will be described. As shown in FIGS. 6A and 6B, when the CPU 21 of the charger 1D starts the downstream end equipment process, the CPU 21 determines whether the battery information is to be stored in the RAM 23 (S31). When it is determined that the battery information is available (S31: YES), the CPU 21 determines whether the charged quantity of the rechargeable battery 10D is greater than the target charged quality (S32). When it is determined that the charged quantity of the rechargeable battery 10D is greater than the target quantity (S32: YES), the CPU 21 calculates the electric power which can be supplied to the upstream charger 1C (hereinafter, referred to a feedable electric power) and the electric power requested to be consumed (hereinafter, referred to as a consumption requested electric power) (S33). The CPU 21 selects the USB PD profile corresponding to the feedable electric power, which is the maximum output electric power based on the specification of the rechargeable battery 10D obtained from the remainder detector 11, and the selected USB PD profile to the power feed request. The CPU 21 obtains consumption requested electric power by subtracting the consumable electric power by the internal discharger 18D (hereinafter, referred to as internal discharge electric power) from the maximum output electric power, and set the thus obtained consumption requested electric power to the power consumption request.

The CPU 21 transmits the swap request including the power feed request and the power consumption request to the charger 1C (S35), and awaits reception of a reply to the swap request (S36: NO). When the reply to the swap request is received (S36: YES), and when the charger 1C denies the swap request (S37: NO), the CPU 21 controls the power fee/receive switcher 17 to connect the discharge controller 16 with the internal discharger 18D. The surplus electric power of the rechargeable battery 10D is consumed by the internal discharger 18D (S41). Then, the CPU 21 advances the process to S50.

When it is determined that the charger 1C accepts the swap request (S37: YES), the CPU 21 executes the swapping process with respect to the port 2. The CPU 21 controls the power feed/receive switcher 17 to connect the discharge controller 16 with the port 2. In the charger 1C, the swapping process is executed, and the port 3 of the charger 1C and the charge controller 15 are connected. The charger 1C and the charger 1D executes negotiation in accordance with the USB PD communication. The charger 1C selects, from the USB PD profile indicated by the charger 1D, the charging electric power of the rechargeable battery 10C and the electric power satisfying the self-internal discharge electric power, and request the charger 1D for the same. The CPU 21 of the charger 1D starts supplying the electric power that the charger 1C requests from the rechargeable battery 10D (S38).

The CPU 21 determines whether the maximum output electric power of the rechargeable battery 10D is greater than the electric power supplied to the charger 1C (S40). When it is determined that the maximum output electric power is equal to or less than the electric power supplied to the charger 1C (S40: NO), there the rechargeable battery 10D does not have the surplus electric power any more, and the CPU 21 advances the process to S50. When it is determined that the maximum output electric power is greater than the electric power supplied to the charger 1C (S40: YES), the CPU 21 controls the power feed/receive switcher 17 to connect the discharge controller 16 with the internal discharger 18D. The surplus electric power of the rechargeable battery 10D is consumed by the internal discharger 18D (S41). Then, the CPU 21 advances the process to S50.

The CPU 21 obtains the charged quantity of the battery cell 12 from the remainder detector 11 of the rechargeable battery 10D, and determines whether the charged quantity is equal to the target quantity (S50). When it is determined that the charged quantity of the rechargeable battery 10D is not equal to the target quantity (S50: NO), the CPU 21 repeats S50 until the charged quantity of the rechargeable battery 10D is reduced as the electric power is supplied and the charged quantity reaches the target quantity. When it is determined that the charged quantity of the rechargeable battery 10D has reached the target quantity (S50: YES), the CPU 21 transmits the redetermination request to the charger 1C (S51), and terminates the downstream end equipment process.

When it is determined that the charged quantity of the rechargeable battery 10D is less than the target quantity (S32: NO; S42: YES), CPU 21 calculates electric power the CPU 21 request the upstream charger 1C to supply (hereinafter, referred to as a reception request electric power) (S43). The CPU 21 sets the reception request electric power, which is the charging electric power based on the specification of the rechargeable battery 10D obtained from the remainder detector 11, to the power reception request. The CPU 21 transmits the power reception request to the charger 1C (S45), and awaits reception of the power feed request and the power consumption request from the charger 1C (S46: NO).

When it is determined that the power reed request and the power consumption request are received from the charger 1C (S46: YES), the CPU 21 executes negotiation with the charger 1C in accordance with the USB PD communication. The CPU 21 selects, from the USB PD profile indicated by the charger 1C, the charging electric power of the rechargeable battery 10D and the electric power which meets the self-internal discharge electric power, and request the charger 1C for the same. Then, the CPU 21 starts charging of the rechargeable battery 10D with the electric power of the rechargeable battery 10C supplied by the charger 1C in response to the request (S47).

The CPU 21 controls the power feed/receive switcher 17 to connects the port 2 with the internal discharger 18D. Then, the CPU 21 consumes the surplus electric power from the upstream rechargeable battery 10C by the self-internal discharger 18D in accordance with the consumption requested electric power (S48). When the charged quantity of the rechargeable battery 10D increases as charged by the rechargeable battery 10C, and the charged quantity of the rechargeable battery 10D has reached the target quantity (S50: YES), the CPU 21 transmits the redetermination request to the charger 1C (S51), and terminates the downstream end equipment process.

When the rechargeable battery 10D is not mounted on the charger 1D, and it is determined that the battery information is not stored in the RAM 23 (S31: NO), the CPU 21 advances the process to S52. When it is determined that the charged quantity of the rechargeable battery 10D is equal to the target quantity (S32: NO; S42: NO), the CPU 21 also advances the process to S52. The CPU 21 determines the reception request electric power, for which the CPU 21 is to request the upstream charger 1C is 0 W, which is set to the power reception request (S52). The CPU 21 transmits the power reception request to the charger 1C (S53), and awaits reception of the power feed request and the power consumption request from the charger 1C (S55: NO). When it is determined that the power feed request and the power consumption request are received from the charger 1C (S55: YES), the CPU 21 controls the power feed/receive switcher 17 to connect the port 2 with the internal discharger 18D. The CPU 21 consumes the surplus electric power of the rechargeable battery 10C by the internal discharger 18D in accordance with the consumption requested electric power (S56). Then, the CPU 21 terminates the downstream end equipment process.

Figure 7A:
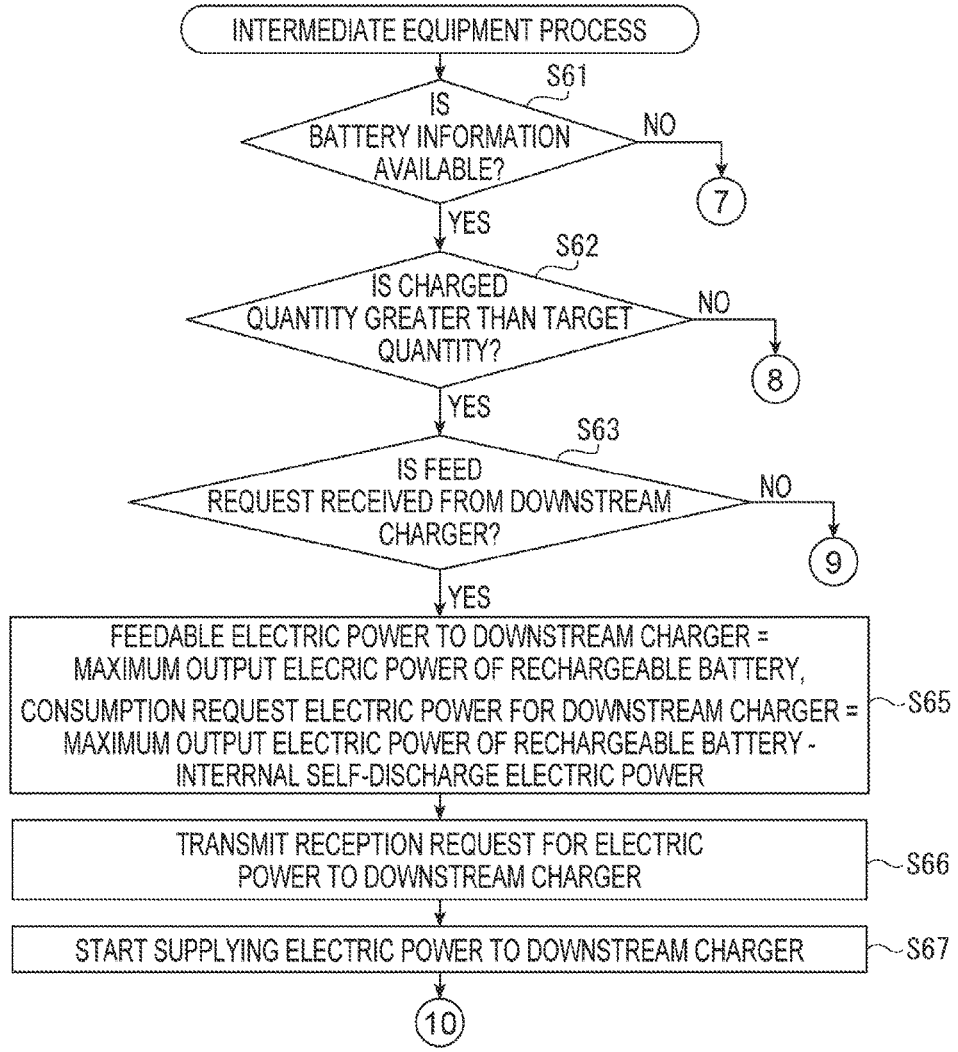
Figure 7B:
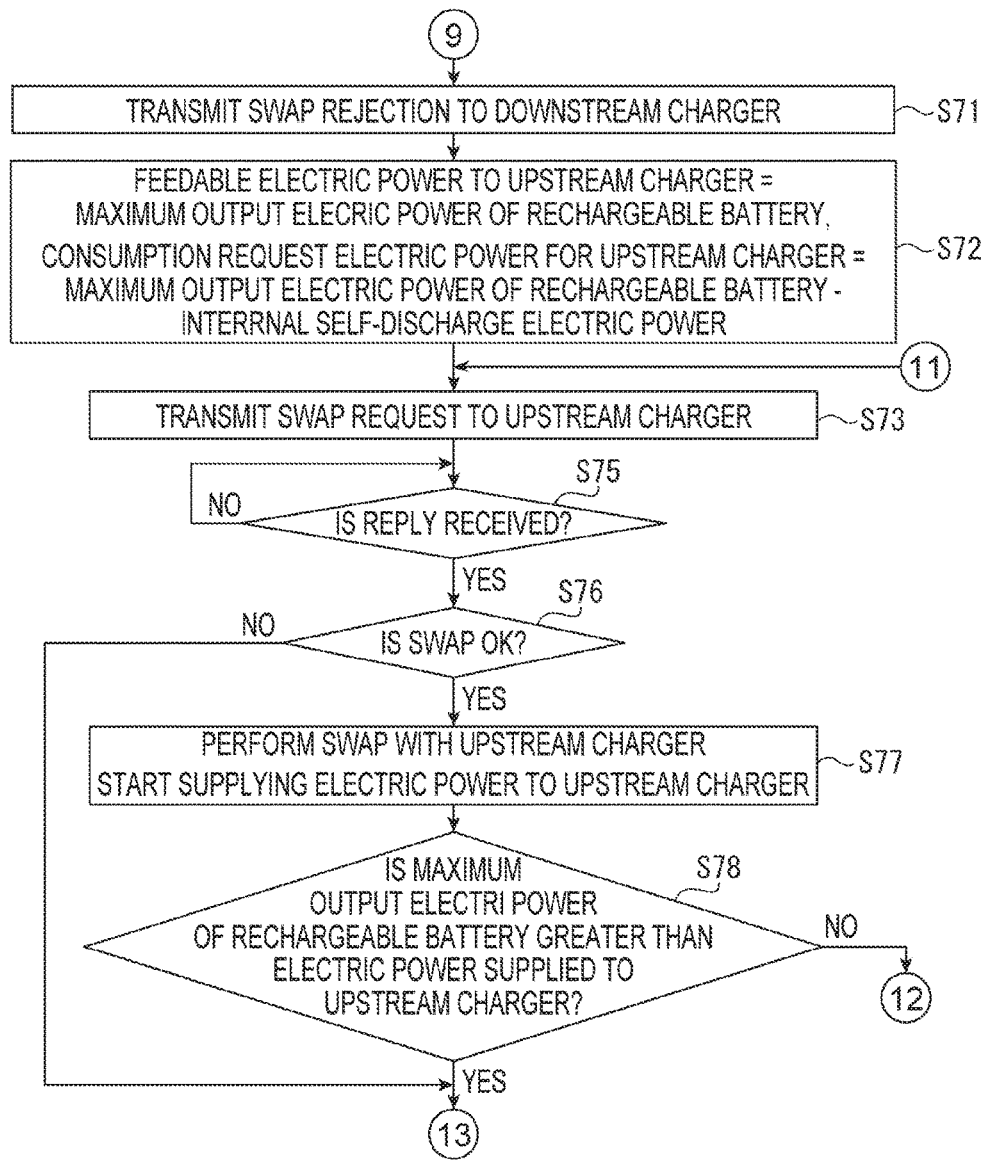
Figure 7C:
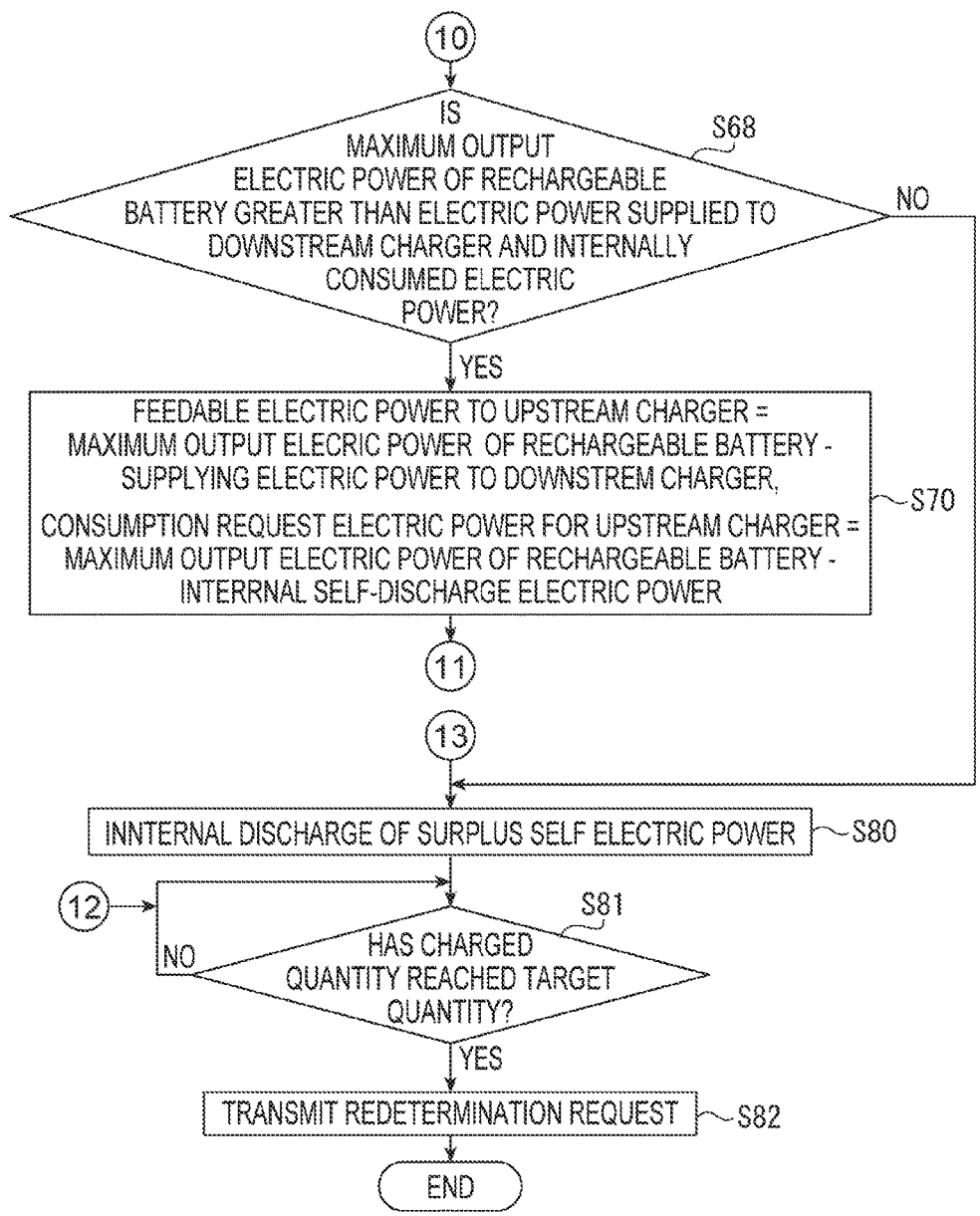

Next, using an operation executed by the CPU 21 of the charger 1C as an example, the intermediate equipment process will be described. As shown in FIGS. 7A, 7B and 7C, when the intermediate equipment process is started, the CPU 21 determines whether a request from the downstream charger 1D is the power reception request (S63) when the battery information is stored in the RAM 23 (S61: YES), and the charged quantity of the rechargeable battery 10C is greater than the target quantity (S62: YES). When the request of the charger 1D is the power reception request (S63: YES), the CPU 21 calculates the feedable electric power supplied to the downstream charger 1D and the consumption requested electric power (S65). The CPU 21 determines the maximum output electric power of the rechargeable battery 10C as the feedable electric power, selects the USB PD profile corresponding to the feedable electric power and sets the same to the power feed request. The CPU 21 calculates the electric power by subtracting the internal discharge electric power in the internal discharger 18D from the maximum output electric power to obtain the consumption requested electric power, and sets the same to the power consumption request.

The CPU 21 transmits, to the charger 1D, the power feed request and the power consumption request (S66), and executes negotiation with the charger 1D in accordance with the USB PD communication. The CPU 21 of the charger 1D selects, from the USB PD profile indicated by the charger 1C, the charging electric power of the rechargeable battery 10D and the electric power meets the self-internal discharge electric power, and requests the charger 1C for the same. The CPU 21 of the charger 1C controls the power feed/receive switcher 17 to connect the port 3 with the discharge controller 16. The CPU 21 then starts supplying, from the rechargeable battery 10C, the electric power requested by the charger 1D (S67).

The CPU 21 determines whether the maximum output electric power is greater than the sum of the electric power supplied to the charger 1D and the internal discharge electric power (S68). When it is determined that the maximum output electric power is equal to or less than the sum of the supplying electric power to the charger 1D and the internal discharge electric power of the charger 1C (S68: NO), the rechargeable battery 10C does not have the surplus electric power which can be supplied to the upstream charger 1B. Therefore, in this case, the CPU 21 advances the process to S80. The CPU 21 controls the power feed/receive switcher 17 to connect the discharge controller 16 with the internal discharger 18C, thereby the surplus electric power of the rechargeable battery 10C being consumed by the internal discharger 18C (S80). As the electric power is supplied to the charger 1D, the charged quantity of the rechargeable battery 10C decreases, and the CPU 21 awaits until the charged quantity of the rechargeable battery 10C reaches the target quantity (S81: NO). when the charged quantity of the rechargeable battery 10C has reached the target quantity (S81: YES), the CPU 21 transmits the redetermination request to each of the chargers 1B and 1D respectively connected to the ports 2 and 3 (S82), and terminates the intermediate equipment process.

When it is determined that the maximum output electric power is greater than the sum of the supplying electric power to the charger 1D and the internal discharge electric power of the charger 1C (S68: YES), the CPU 21 advances the process to S70. The CPU 21 calculates the feedable electric power to be supplied to the upstream charger 1B and the consumption requested electric power (S70). Then, the CPU 21 calculate the feedable electric power by subtracting the electric power supplied to the charger 1D from the maximum output electric power of the rechargeable battery 10C, selects the USB PD profile corresponding to the feedable electric power, and sets the selected USB PD profile to the power feed request. Further, the CPU 21 calculates the consumption requested electric power by subtracting the electric power supplied to the charger 1D and the internal discharge electric power of the internal discharger 18C from the maximum output electric power, and sets the calculated consumption requested electric power to the power consumption request.

Then, the CPU 21 transmits the swap request including the power feed request and the power consumption request to the charger 1B (S73), and awaits reply to the swap request (75: NO). When the reply to the swap request is received (S75: YES), and the charger 1B denies the swap request (S76: NO), the CPU 21 advances the process to S80, and consumes the surplus electric power of the rechargeable battery 10C by the discharger 18C (S80). Thereafter, the CPU 21 advances the process to S81. When the charged quantity of the rechargeable battery 10C has reached the target quantity (S81: YES), the CPU 21 transmits the redetermination request to each of the chargers 1B and 1D (S82), and terminates the intermediate equipment process.

When it is determined that the charger 1B accepts the swap request (S76: YES), the CPU 21 executes the swapping process. The CPU 21 controls the power feed/receive switcher 17 to connect the discharge controller 16 with the port 2. In the charger 1B, the swapping process is executed, and the port 3 of the charger 1B is connected with the charge controller 15. Then, the charger 1B and the charger 1C executes negotiation in accordance with the USB PD communication. The CPU 21 of the charger 1B selects the charging electric power of the rechargeable battery 10B and the electric power that meets the self-internal discharge electric power from the USB PD profile indicated by the charger 1C, and request the charger 1C for the same. The CPU 21 of the charger 1C controls the power feed/receive switcher 17 to connect the port 2 with the discharge controller 16. Then, the CPU 21 of the charger 1C starts supplying the electric power requested by the charger 1B from the rechargeable battery 10C (S77).

The CPU 21 determines whether the maximum output electric power of the rechargeable battery 10D is greater than the electric power supplied to the chargers 1B and 1D (S78). When it is determined that the maximum output electric power of the rechargeable battery 10D is equal to or less than the electric power supplied to the chargers 1B and 1D (S78: NO), the rechargeable battery 10C does not have the surplus electric power any more, and the CPU 21 advances the process to S81. When it is determined that the maximum output electric power of the rechargeable battery 10D is greater than the electric power supplied to the chargers 1B and 1D (S78: YES), the CPU 21 connects the discharge controller 16 with the internal discharger 18C, thereby consuming the surplus electric power of the rechargeable battery 10C by the internal discharger 18C (S80). Similar to the disclosure above, when the charge quantity of the rechargeable battery 10C has reached the target quantity (S81: YES), the CPU 21 transmits the redetermination request to each of the chargers 1B and 1D (S82), and terminates the intermediate equipment process.

Next, when the charged quantity of the rechargeable battery 10C is greater than the target quantity, and when the swap request is received from the downstream charger 1D, the CPU 21 denies the swap request (S71). The CPU 21 calculates the feedable electric power supplied to the upstream charger 1B and the consumption requested electric power (S72). The CPU 21 determines the maximum output electric power of the rechargeable battery 10C as the feedable electric power, selects the USB PD profile corresponding to the feedable electric power, and sets the selected USB PD profile to the power feed request. The CPU 21 obtains the consumption requested electric power by subtracting the internal discharge electric power of the discharger 18C from the maximum output electric power, and sets the consumption requested electric power to the power consumption request. Then, the CPU 21 advances the process to S73. The process in S73-S82 is the same as described above.

Figure 8A:
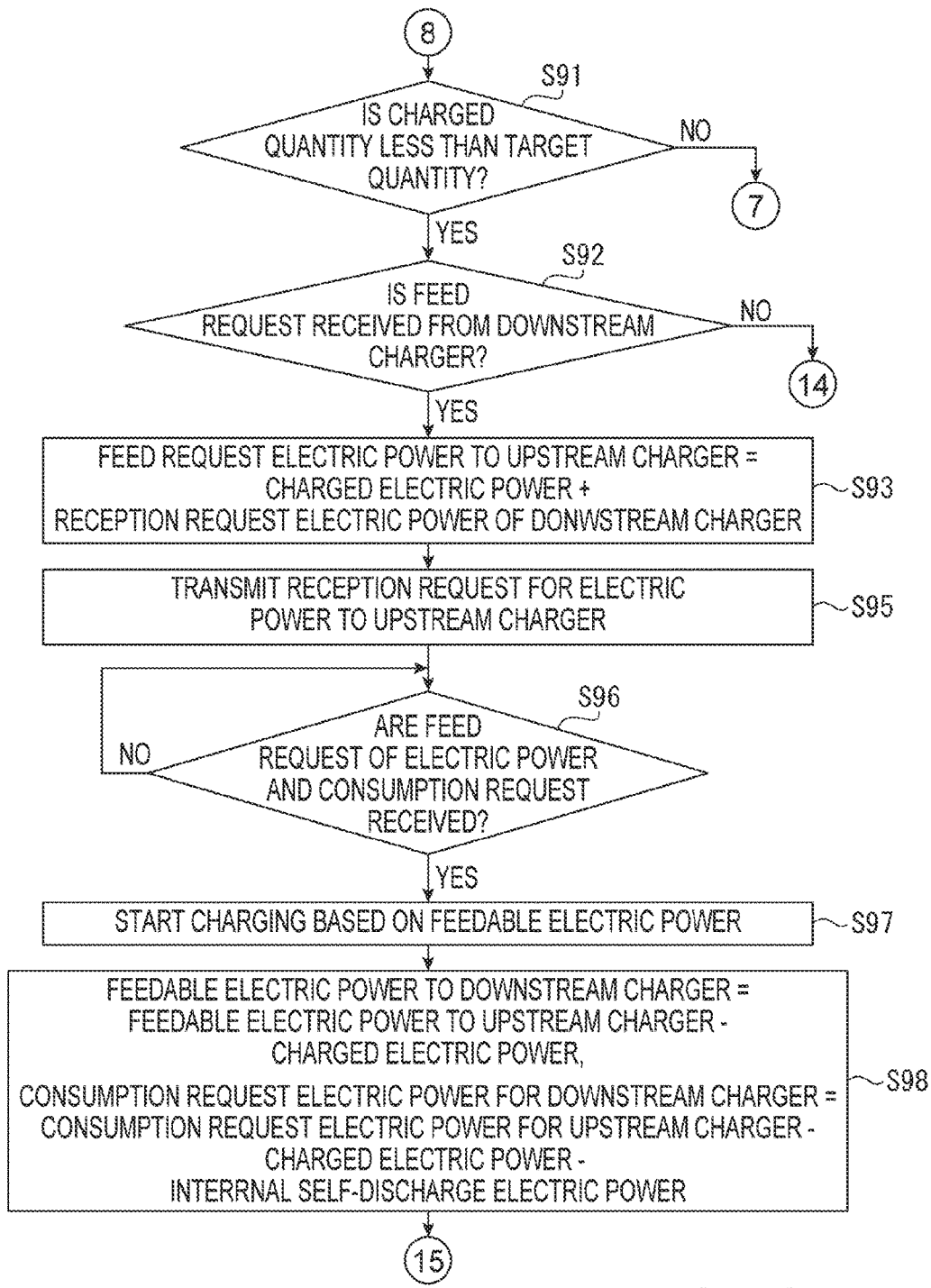
Figure 8B:
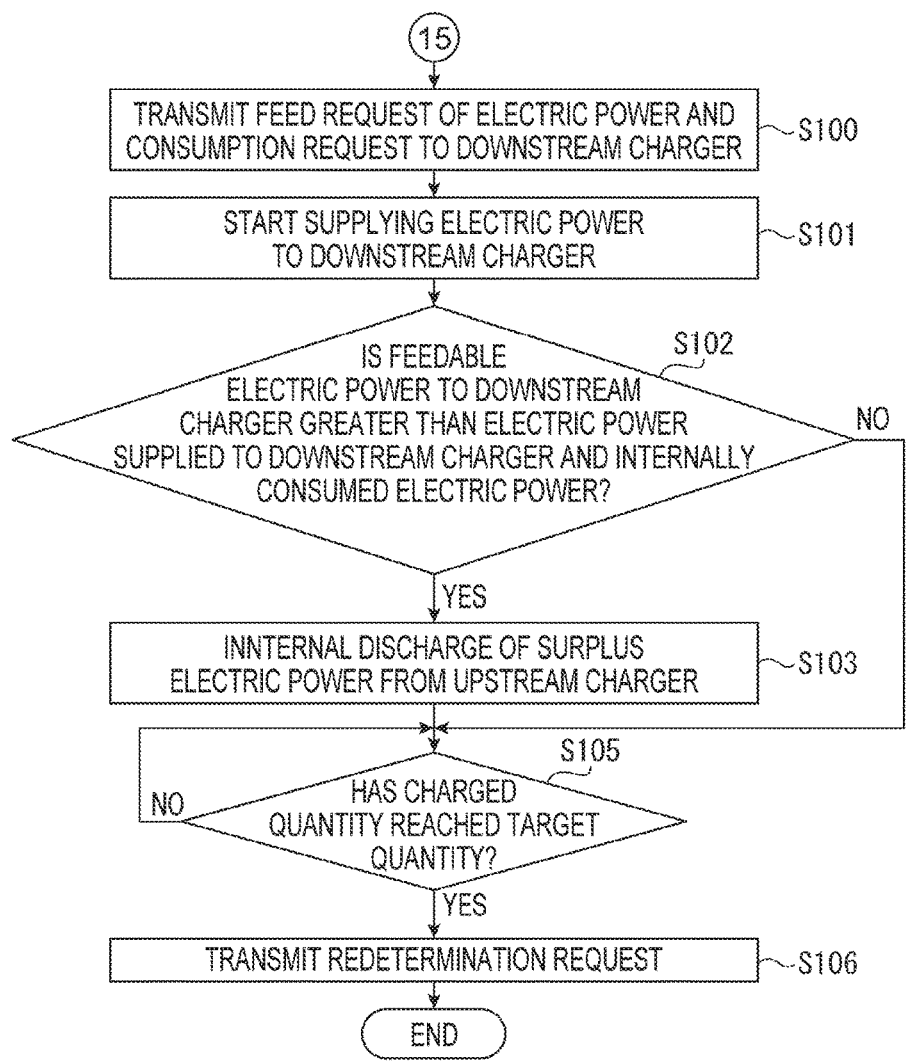

When it is determined that the charged quantity of the rechargeable battery 10C is equal to or less than the target charge quantity (S60: NO), the CPU 21 advances the process to S91. As shown in FIGS. 8A and 8B, the charged quantity of the rechargeable battery 10C is less than the target quantity (S91: YES), the CPU 21 determines whether the request transmitted from the downstream charger 1D is the power reception request (92). When the request transmitted from the charger 1D is the power reception request (S92: YES), the CPU 21 calculates the reception request electric power for which the CPU 21 requests the upstream charger 1B (S93). The CPU 21 calculates the reception request electric power by adding the charging electric power based on the specification of the rechargeable battery 10C and the reception request electric power of the rechargeable battery 10D, and sets the thus obtained reception request electric power to the power reception request. The CPU 21 then transmits the power reception request to the charger 1B (S95), and awaits reception of power feed request and the power consumption request from the charger 1B (S96: NO).

When the CPU 21 receives the power reed request and the consumption request from the charger 1B (S96: YES), the CPU 21 executes the negotiation with the charger 1B in accordance with the USB PD profile indicated by the charger 1B. The CPU 21 selects, from the USB PD profile indicated by the charger 1B, the electric power which meets charging electric power of the rechargeable battery 10C, the self-internal discharge electric power, the charging electric power of the downstream rechargeable battery 10D, and the internal discharging electric power of the charger 1D, and requests the charger 1B for the electric power. The CPU 21 controls the power feed/receive switcher 17 to connect the port 2 with the charge controller 15. The CPU 21 starts charging the rechargeable battery 10C based on the request with the electric power of the rechargeable battery 10B (S97). It is noted that, from the charge 1B, at least the charging electric power to meet the rechargeable battery 10C and the downstream rechargeable battery 10D is supplied. The CPU 21 controls the charge controller 15 and charges the rechargeable battery 10C with the electric power corresponding to the charging electric power of the rechargeable battery 10C.

The CPU 21 calculates the feedable electric power to be supplied to the downstream charger 1D and the consumption requested electric power (S98). The CPU 21 calculates the electric power by subtracting the charging electric power of the rechargeable battery 10C from the feedable electric power of the upstream charger 1B indicated by the USB PD profile, and determines the thus calculated electric power as the feedable electric power to the downstream charger 1D. The CPU 21 selects the USB PD profile corresponding to the feedable electric power and sets the selected USB PD profile to the power feed request. The CPU 21 calculates the consumption requested electric power by subtracting the charging electric power of the rechargeable battery 10C and the internal discharging electric power by the internal discharger 18C, and sets the calculated consumption requested electric power to the power consumption request.

The CPU 21 transmits the power feed request and the power consumption request to the charger 1D (S100), and executes negotiation with the charger 1D in accordance with the USB PD communication. The CPU 21 of the charger 1D selects the electric power meeting the charging electric power of the rechargeable battery 10D and the self-internal discharge electric power from the USB PD profile, and requests the charger 1C for the selected electric power. The CPU 21 of the charger 1C controls the power feed/receive switcher 17 to connect the port 2 with the port 3. The CPU 21 starts supplying the electric power which the charger 1D requested from the electric power received from the upstream charger 1B (S101).

The CPU 21 determines whether the feedable electric power to the downstream charger 1D is greater than the sum of the electric power which is received from the upstream charger 1B and supplied to the downstream charger 1D and the internal discharge electric power (S102). When it is determined that the feedable electric power to the downstream charger 1D is equal to or less than the sum of the electric power which is received from the upstream charger 1B and supplied to the downstream charger 1D and the internal discharge electric power (S102: NO), the rechargeable battery 10B does not have the surplus electric power any more, and the CPU 21 advances the process to S105. When it is determined that the feedable electric power to the downstream charger 1D is greater than the sum of the electric power which is received from the upstream charger 1B and supplied to the downstream charger 1D and the internal discharge electric power (S102: YES), the CPU 21 controls the power feed/receive switcher 17 to connect the port 2 with the internal discharger 18C. The CPU 21 discharges the surplus electric power of the rechargeable battery 10B by the internal discharger 18C (S103). The CPU 21 awaits until the charged quantity of the rechargeable battery 10C increases as charged from the charger 1B and the charged quantity thereof reaches the target quantity (S105: NO). When the charged quantity of the rechargeable battery 10C has reached the target quantity (S105: YES), the CPU 21 transmits the redetermination request to each of the chargers 1B and 1D respectively connected to the ports 2 and 3 (S106), and terminates the intermediate equipment process.

Figure 10A:
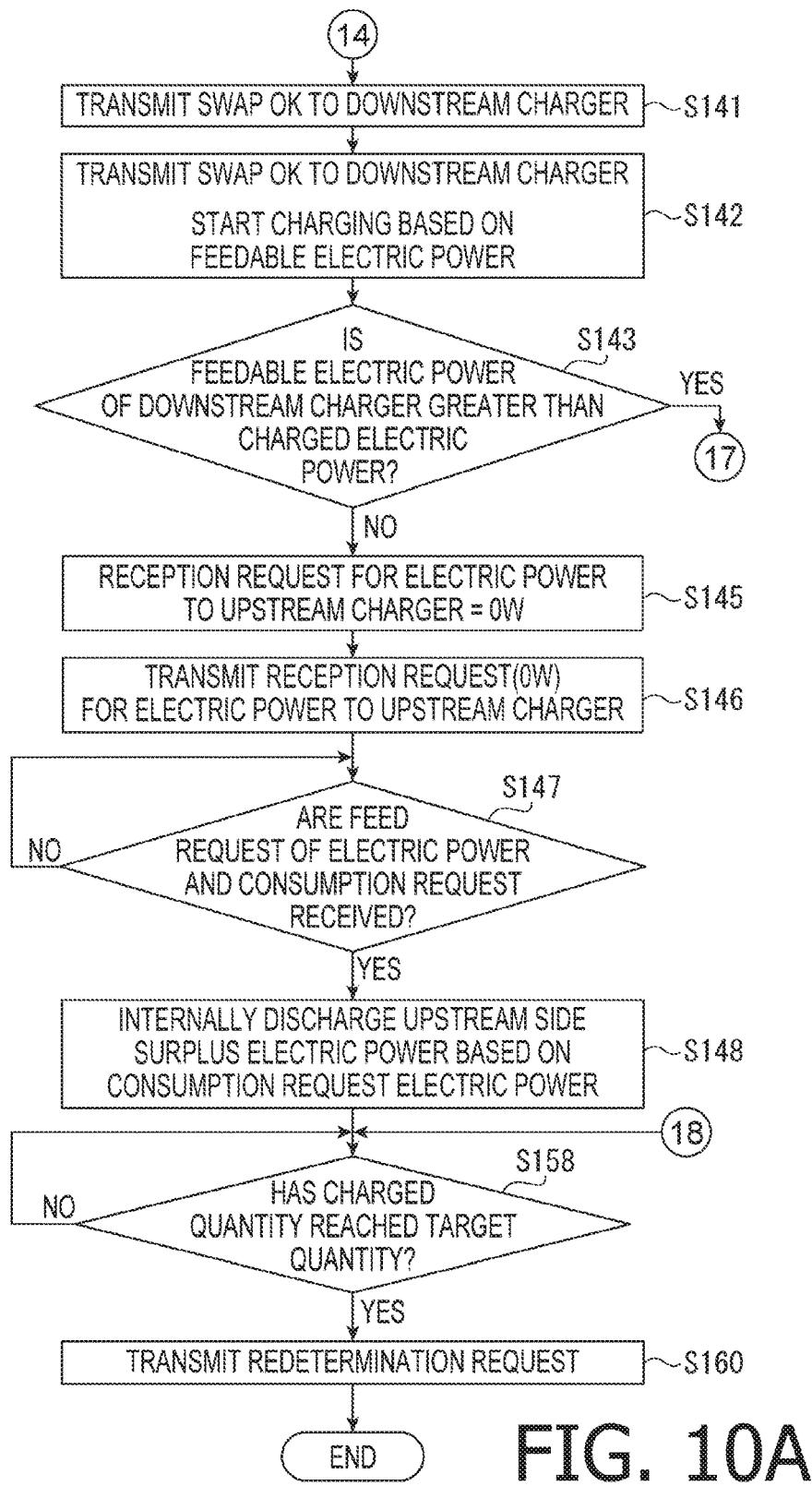
Figure 10B:
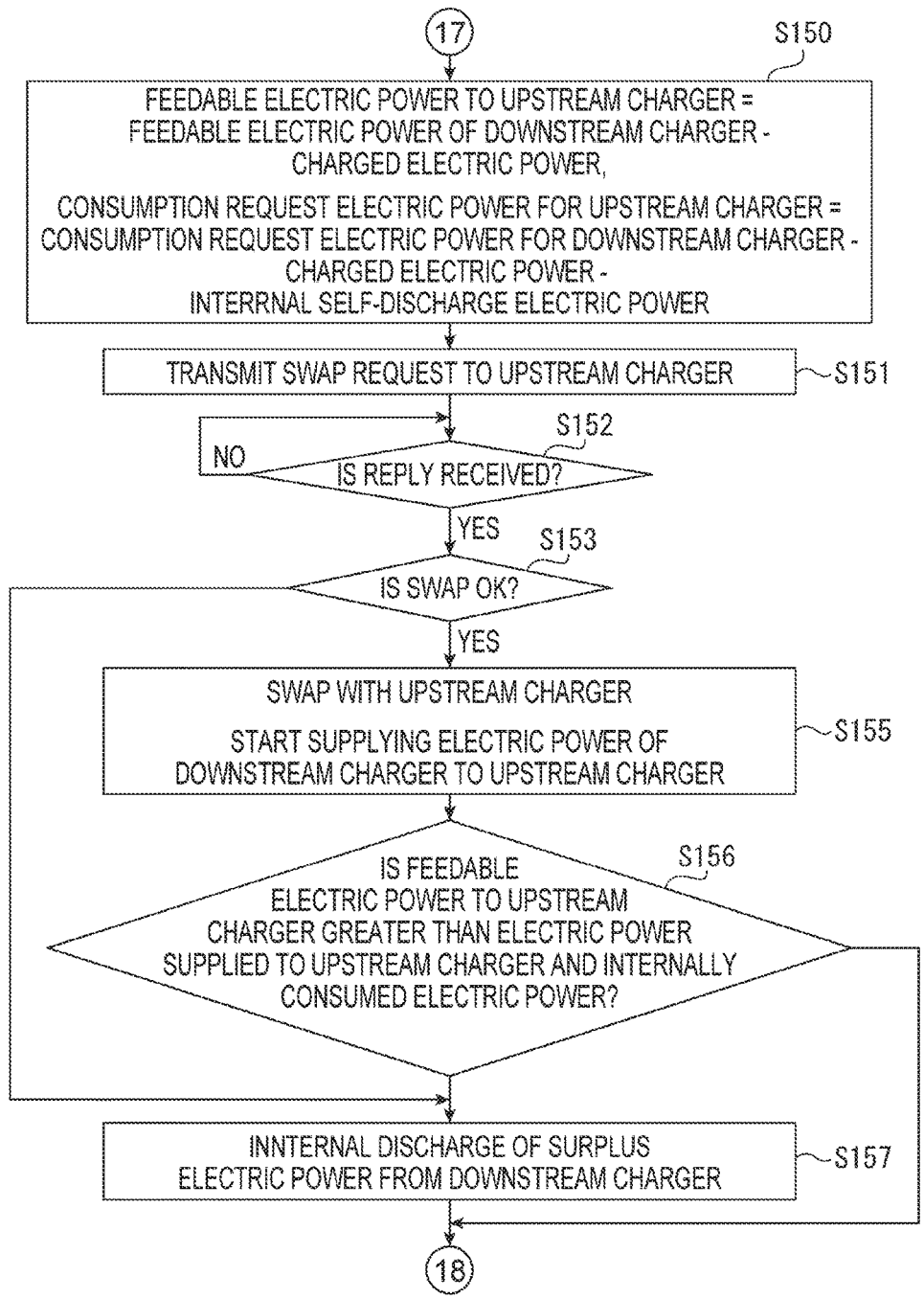

When the charged quantity of the rechargeable battery 10C is less than the target quantity, and the swap request is received from the downstream charger 1D (S92: NO), the CPU 21 accepts the swap request (S141) as shown in FIGS. 10A and 10B. The CPU 21 executes the swapping process with respect to the port 3. That is, the CPU 21 controls the power feed/receive switcher 17 to connect the charge controller 15 with the port 3. In the charger 1D, the swapping process is also executed, and the port 2 of the charger 1D and the discharge controller 16 are connected. The charger 1C and the charger 1D execute negotiation in accordance with the USB PD communication. The CPU 21 of the charger 1C selects the electric poser meeting the charging electric power of the rechargeable battery 10C and the self-internal discharge electric power from the USP PD profile indicated by the charger 1D, and requests the charger 1D for the electric power. The CPU 21 start charging the rechargeable battery 10C with the electric power of the rechargeable battery 10D which is supplied by the charger 1D in accordance with the request (S142).

The CPU 21 determines whether the feedable electric power of the downstream charger 1D is greater than the charging electric power of the rechargeable battery 10C (S143). When it is determined that the feedable electric power of the downstream charger 1D is equal to or less than the charging electric power of the rechargeable battery 10C (S143: NO), the rechargeable battery 10D does not have the surplus electric power to supply to the upstream charger 1B, the CPU 21 advances the process to S145. The CPU 21 determines the reception request electric power requesting to the upstream charger 1B is 0 W, and sets the same to the power reception request (S145). The CPU 21 transmits the power reception request to the charger 1B (S146), and awaits reception of the power feed request and the power consumption request from the charger 1B (S147: NO). When the power feed request and the power consumption request are received from the charger 1B (S147: YES), the CPU 21 controls the power feed/receive switcher 17 to connect the port 2 with the internal discharger 18C. The CPU 21 consumes the surplus electric power of the rechargeable battery 10D by the internal discharger 18C in accordance with the consumption requested electric power (S148).

The CPU 21 awaits until the charged quantity of the rechargeable battery 10C increases as charged from the charger 1D and the charged quantity reaches the target quantity (S158: NO). when the charged quaintly of the rechargeable battery 10C has reached the target quantity (S158: YES), the CPU 21 transmits the redetermination request to each of the chargers 1B and 1D respectively connected to the ports 2 and 3 (S160), and terminates the intermediate equipment process.

When it is determined that the feedable electric power is greater than the charging electric power of the rechargeable battery 10C (S143: YES), the CPU 21 calculates the feedable electric power supplied to the upstream charger 1B and the consumption requested electric power) (S150). The CPU 21 calculates the electric power by subtracting the charging electric power of the rechargeable battery 10C from the feedable electric power of the downstream charger 1D indicated by the USB PD profile, and sets the calculated electric power to the feedable electric power to the upstream charger 1B. The CPU 21 selects the USB PD profile corresponding to the feedable electric power, and sets the same to the power feed request. Further, the CPU 21 obtains the consumption requested electric power by subtracting the charging electric power of the rechargeable battery 10C and the internal discharge electric power by the internal discharger 18C from the consumption requested electric power of the upstream charger 1D, and sets the thus obtained consumption requested electric power to the power consumption request.

The CPU 21 transmits the swap request including the power feed request and the power consumption request to the charge 1B (S151), and awaits reception of the reply to the swap request (S152: NO). When the reply to the swap request is received (S152: YES) and the charger 1B denies the swap request (S153: NO), the CPU 21 advances the process to S157. In S157, the CPU 21 controls the power feed/receive switcher 17 to connect the port 3 with the internal discharger 18C. The CPU 21 consumes the surplus electric power of the downstream rechargeable battery 10D by the internal discharger 18C (S157). Then, the CPU 21 advances the process to S158. When the charged quantity of the rechargeable battery 10C has reached the target quantity (S158: YES), the CPU 21 transmits the redetermination request to each of the chargers 1B and 1D (S150), and terminates the intermediate equipment process.

When it is determined that the charger 1B accepts the swap request (S153: YES), the CPU 21 executes the swapping process. The CPU 21 controls the power feed/receive switcher 17 to connect the port 2 with the port 3. In the charger 1B, the swapping process is executed, and the port 3 of the charger 1B and the charge controller 15 are connected.

The charger 1B and the charger 1C execute negotiation in accordance with the USB PD communication. The CPU 21 of the charger 1B selects the electric power meeting the charging electric power of the rechargeable battery 10B and self-internal discharge electric power from the USB PD profile indicated by the charger 1C, and requests the charger 1C for the same. The CPU 21 of the charger 1B starts supplying the electric power which is requested by the charger 1B from the electric power received from the downstream charger 1D (S155). It is noted that the charger 1D transmits the electric power meeting at least the charging electric power for the rechargeable battery 10C and the upstream rechargeable battery 10B. The CPU 21 controls the charge controller 15 and charges the rechargeable battery 10C with the electric power corresponding to the charging electric power of the rechargeable battery 10C.

The CPU 21 determines whether the feedable electric power with respect to the charger 1B is greater than the sum of the electric power, which is received from the downstream charger 1D and to be supplied to the upstream charger 1B and the internal discharge electric power (S156). When it is determined that the feedable electric power with respect to the charger 1B is equal to or less than the sum of the electric power to be supplied to the upstream charger 1B and the internal discharge electric power (S156: NO), the rechargeable battery 10D does not have the surplus electric power any more, and the CPU 21 advances the process to S158. When it is determined that the feedable electric power with respect to the charger 1B is greater than the sum of the electric power to be supplied to the upstream charger 1B and the internal discharge electric power (S156: YES), the CPU 21 controls the power feed/receive switcher 17 to connect the port 3 with the internal discharger 18C. The CPU 21 consumes the surplus electric power of the rechargeable battery 10D by the discharger 18C (S157). The CPU 21 advances the process to S158. When the charged quantity of the rechargeable battery 10C has reached the target quantity (S158: YES), the CPU 21 transmits the redetermination request to each of the chargers 1B and 1D (S160), and terminates the intermediate equipment process.

Figure 9B:
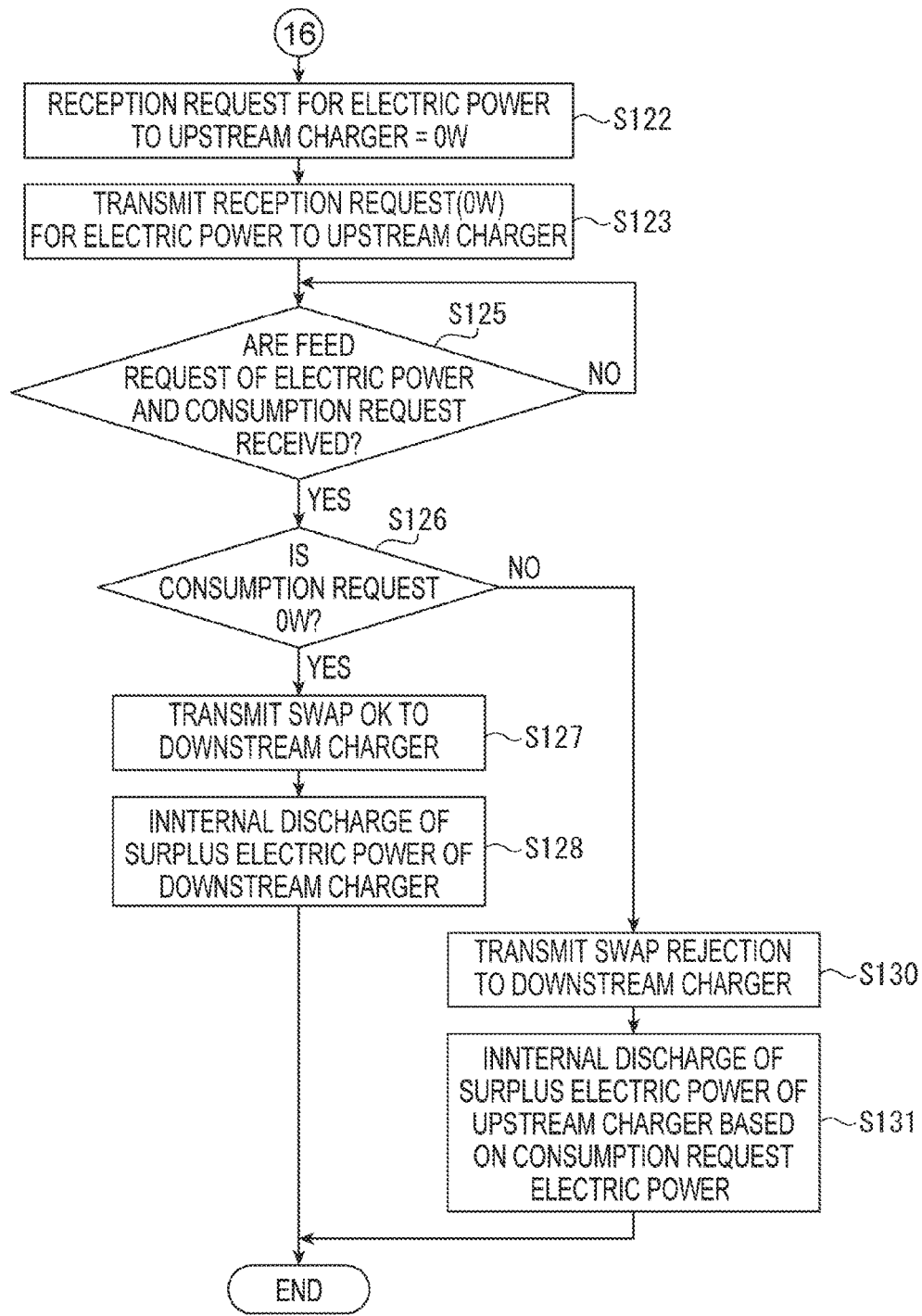

When it is determined that the rechargeable battery 10C is not mounted on the charger 1C, and the battery information is not stored in the RAM 23 (S61: NO), the CPU 21 advances the process to S111. When the charged quantity of the rechargeable battery 10C is equal to the target quantity (S62: NO; S91: NO), the CPU 21 advances the process to S111. As shown in FIGS. 9A and 9B, the CPU 21 determines whether the request from the downstream charger 1D is the power reception request (S111). When it is determined that the power reception request is received from the charger 1D (S111: YES), the CPU 21 calculates the reception request electric power to be required to the upstream charger 1B (S112). The CPU 21 determines the reception request electric power of the rechargeable battery 10D included in the power reception request from the charger 1D as the reception request electric power, and sets the same to the power reception request. The CPU 21 transmits the power reception request to the charger 1B (S113), and awaits reception of the power feed request and the power consumption request from the charger 1B (S115: NO).

When the power feed request and the power consumption request are received from the charger 1B (S115: YES), the CPU 21 calculates the feedable electric power to be supplied to the downstream charger 1D and the consumption requested electric power (S116). The CPU 21 determines the feedable electric power of the upstream charger 1B indicated by the USB PD profile as the feedable electric power with respect to the downstream charger 1D. The CPU 21 selects the USB PD profile corresponding to the feedable electric power, and sets the same to the power feed request. The CPU 21 calculates the consumption requested electric power by subtracting the internal discharge electric power by the internal discharger 18C from the consumption requested electric power of the upstream charger 1B, and sets the same to the power consumption request.

The CPU 21 transmits the power feed request and the power consumption request to the charger 1D (S117), and executes negotiation with the charger 1D in accordance with the USB PD communication. The CPU 21 of the charger 1D selects the electric power which meets the charging electric power of the rechargeable battery 10D and the internal discharge electric power from the USB PD profile indicated by the charger 1C, and requests the charger 1C for the same.

The CPU 21 executes negotiation with the charger 1B in accordance with the USB PD communication. The CPU 21 requests the charger 1B for the electric power which is selected by the charger 1D from the USB PD profile, and the electric power satisfying the internal discharge electric power. The CPU 21 controls the power feed/receive switcher 17 to connect the port 2 with the port 3. The CPU 21 start supplying the electric power requested by the charger 1D from the electric power received from the upstream charger 1B (S118).

The CPU 21 determines whether the feedable electric power with respect to the downstream charger 1D is greater than the sum of the electric power received from the upstream charger 1B and supplied to the downstream charger 1D and the internal discharge electric power (S120). When the feedable electric power with respect to the downstream charger 1D is equal to or less than the sum of the electric power received from the upstream charger 1B and supplied to the downstream charger 1D and the internal discharge electric power (S120: NO), the rechargeable battery 10B does not have the surplus electric power, and the CPU 21 terminates the intermediate equipment process. When the feedable electric power with respect to the downstream charger 1D is greater than the sum of the electric power received from the upstream charger 1B and supplied to the downstream charger 1D and the internal discharge electric power (S120: YES), the CPU 21 controls the power feed/receive switcher 17 to connect the port 2 with the internal discharger 18C. The CPU 21 consumes the surplus electric power of the rechargeable battery 10B by the discharger 18C (S121), and terminates the intermediate equipment process.

When it is determined that the swap request is received from the charger 1D (S111: NO), the CPU 21 determines that the reception request electric power to be requested to the upstream charger 1B is 0 W, and sets the value to the power reception request (S122). The CPU 21 transmits the power reception request to the charger 1B (S123), and awaits reception of the power feed request and the power consumption request from the charger 1B (S125: NO). When the power feed request and the power consumption request are received (S125: YES), the CPU 21 determines whether the consumption requested electric power is 0 W (S126).

When the consumption requested electric power of the charger 1B is 0W (S126: YES), the CPU 21 accepts the swap request from the downstream charger 1D (S127). The CPU 21 controls the power feed/receive switcher 17 to connect the port 3 with the internal discharger 18C. Then, the CPU 21 consumes the surplus electric power of the downstream rechargeable battery 10D by the internal discharger 18C (S128) and terminates the intermediate equipment process.

When it is determined that the consumption requested electric power of the charger 1B is not 0 W (S126: NO), the CPU 21 denies the swap request from the downstream charger 1D (S130). The CPU 21 controls the power feed/receive switcher 17 to connect the port 2 with the internal discharger 18C. The CPU 21 consumes the surplus electric power of the upstream rechargeable battery 10B by the internal discharger 18C (S131) and terminates the intermediate equipment process.

Figure 11A:
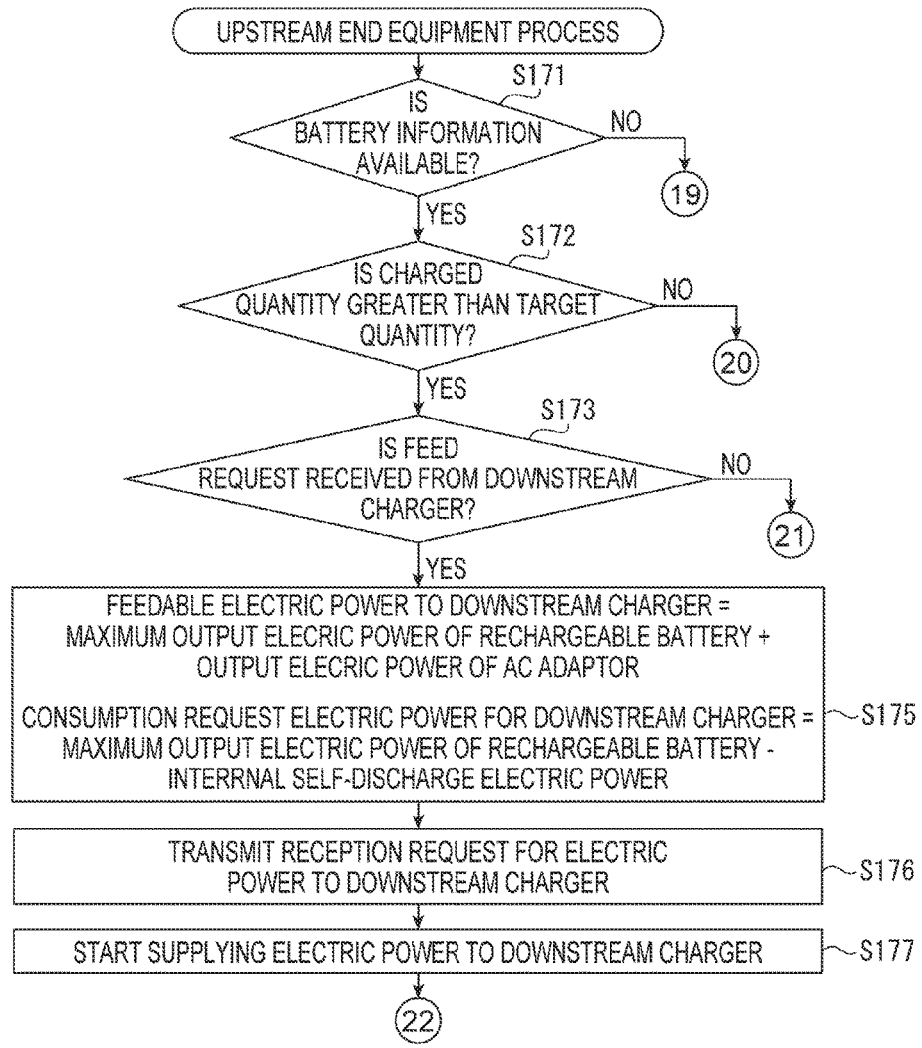
FIGS. 11A-11C and 12 show a flowchart illustrating an upstream end equipment process.
Figure 11B:
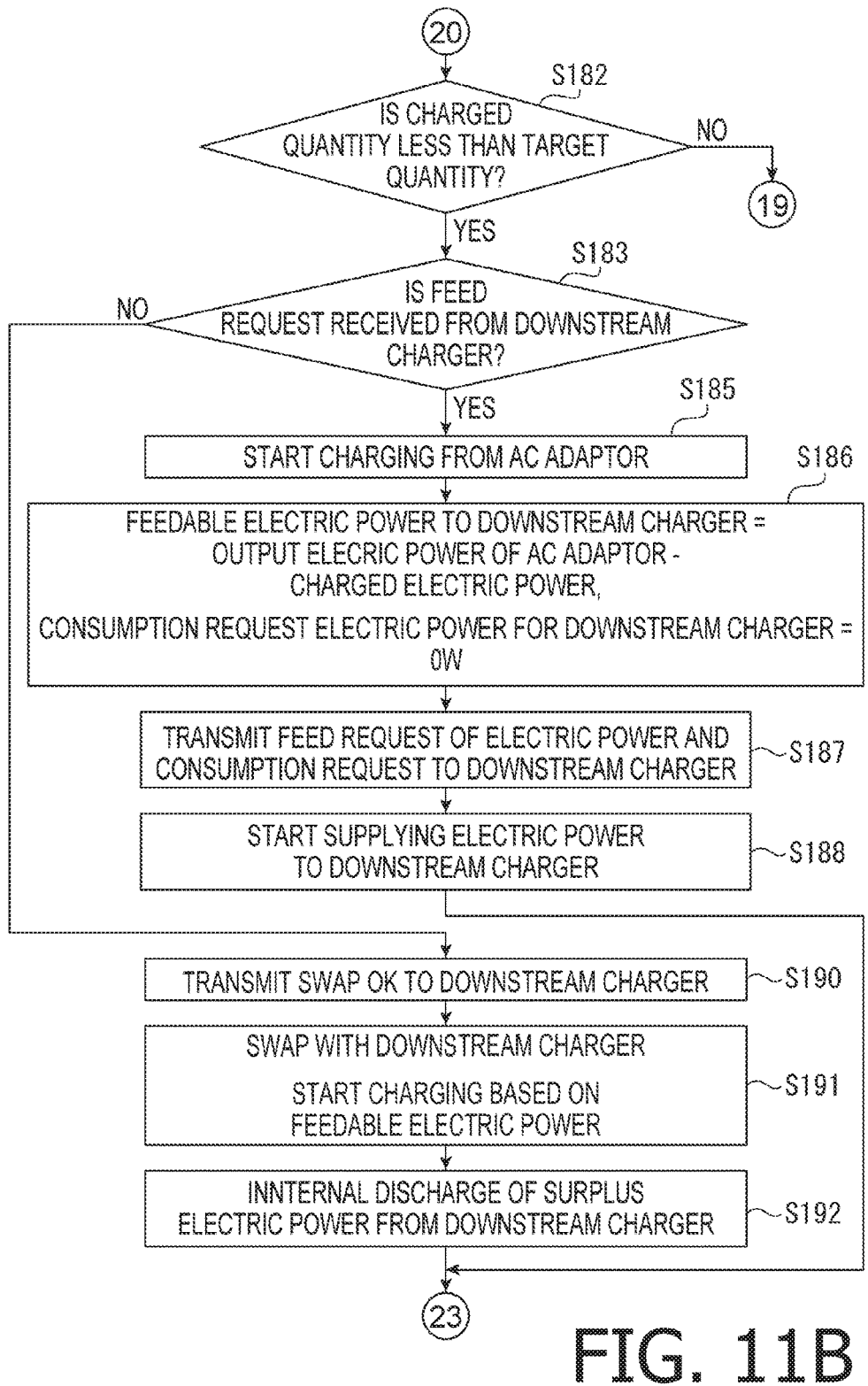
Figure 11C:
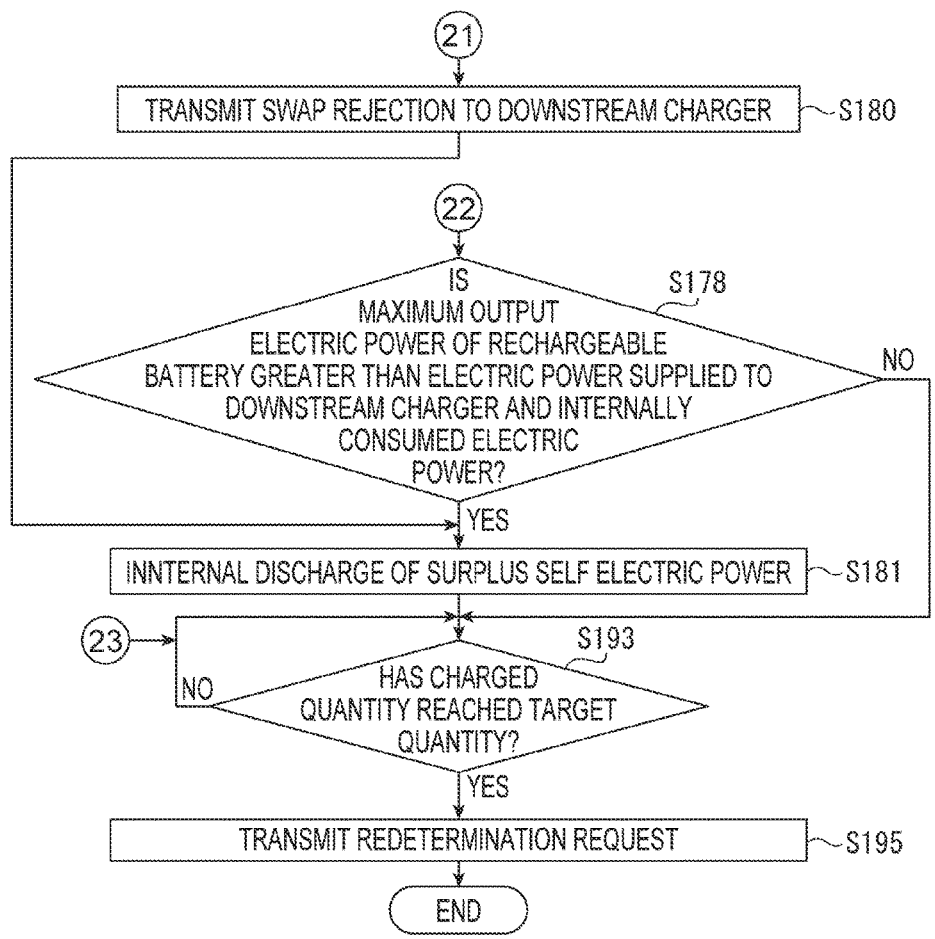

Next, referring to an operation executed by the CPU 21 of the charger 1A as an example, the upstream end equipment process will be described. As shown in FIGS. 11A-11C, as the upstream end equipment process is started, the CPU 21 of the charger 1A determines whether a request from the downside charger 1B is the power reception request (S173) when the battery information is stored in the RAM 23 (S171: YES), and the charged quantity of the rechargeable battery 10A is greater than the target quantity (S172: YES). When the request from the charger 1B is the power reception request (S173: YES), the CPU 21 calculates the feedable electric power supplied to the charger 1B and the consumption requested electric power (S175). The CPU 21 determines the sum of the maximum output electric power of the rechargeable battery 10A and the output electric power of the AC adaptor 9 as the feedable electric power, selects the USB PD profile corresponding to the feedable electric power, and sets the same to the power feed request. The CPU 21 calculates the consumption requested electric power by subtracting the internal discharge electric power by the internal discharger 18A from the maximum output electric power, and sets the same to the power consumption request.

The CPU 21 transmits the power feed request and the power consumption request to the charger 1B (S176), and executes negotiation with the charger 1B in accordance with the USB PD communication. The CPU 21 of the charger 1B selects the charging electric power of the rechargeable battery 10B and the electric power satisfying the internal discharge electric power from the USB PD profile indicated by the charger 1A, and requests the charger 1A for the same. The CPU 21 of the charger 1A controls the power feed/receive switcher 17 to connect the port 3 with the discharge controller 16. The CPU 21 starts supplying the electrical power requested by the charger 1B from the rechargeable battery 10A (S177).

The CPU 21 determines whether the maximum output electric power of the rechargeable battery 10A is greater than the sum of the electric power supplied to the charger 1B and the internal discharge electric power (S178). When it is determined that the maximum output electric power of the rechargeable battery 10A is equal to or less than the sum of the electric power supplied to the charger 1B and the internal discharge electric power (S178: NO), the rechargeable battery 10B does not have the surplus electric power, and the CPU 21 advances the process to S193. When it is determined that the maximum output electric power of the rechargeable battery 10A is greater than the sum of the electric power supplied to the charger 1B and the internal discharge electric power (S178: YES), the CPU 21 controls the power feed/receive switcher 17 to connect the discharge controller 16 with the internal discharger 18A. The CPU 21 consumes the surplus electric charge of the rechargeable battery 10A by the internal discharger 18A (S181). The CPU 21 advances the process to S193. The charged quantity of the rechargeable battery 10A decreases as the electric power is supplied to the charger 1B, and the CPU 21 awaits until the charged quantity reaches the target quantity (S193: NO). When it is determined that the charge quantity of the rechargeable battery 10A has reached the target quantity (S193: YES), the CPU 21 transmits the redetermination request to the charge 1B which is connected to the port 3 (S195), and terminates the upstream end equipment process.

When it is determined that a request from the charger 1B is the swap request (S173: YES), the CPU 21 denies the swap request (S180). The CPU 21 advances the process to S18, and consumes the surplus electric power of the rechargeable battery 10A by the internal discharger 18A (S181). The CPU 21 advances the process to S193. When the charged quantity of the rechargeable battery 10A has reached the target quantity (S193: YES), the CPU 21 transmits the redetermination request to the charger 1B (S195), and terminates the upstream end equipment process.

When it is determined that the charged quantity of the rechargeable battery 10A is less than the target quantity (S172: NO), the CPU 21 advances the process to S182. When the charged quantity of the rechargeable battery 10A is less than the target quantity (S182: YES), the CPU 21 determines whether a request from the downstream charger 1B is the power reception request (S183). When it is determined that the request from the charger 1B is the power reception request (S183: YES), the CPU 21 executes negotiation with the AC adaptor 9 in accordance with the USB PD communication. The CPU 21 obtains information regarding the output electric power of the AC adaptor 9. The CPU 21 selects the charging electric power of the rechargeable battery 10B and the electric power satisfying the internal discharge electric power from the USB PD profile indicated by the AC adaptor 9, and request the AC adaptor 9 for the same. The CPU 21 controls the power feed/receive switcher 17 and connects the port 2 with the charge controller 15. The CPU 21 starts charging the rechargeable battery 10A using the output electric power of the AC adaptor 9 (S185).

The CPU 21 calculates the feedable electric power supplied to the downstream charger 1B and the consumption requested electric power (S186). The CPU 21 calculate the electric power by subtracting the charging electric power of the rechargeable battery 10A from the output electric power of the AC adaptor 9, and determines the calculated electric power as the feedable electric power with respect to the downstream charger 1B. The CPU 21 selects the USB PD profile corresponding to the feedable electric power, and sets the same to the power feed request. The CPU 21 determines the consumption requested electric power with respect to the downstream charger 1B as 0 W, and set 0 W to the power consumption request.

The CPU 21 transmits the power feed request and the power consumption request to the charger 1B (S187), and executes negotiation with the charger 1B in accordance with the USB PD communication. The CPU 21 of the charger 1B selects the charging electric power of the rechargeable battery 10B and the electric power satisfying the self-internal discharge electric power from the USB PD profile indicated by the charger 1A, and request the charger 1A for the same. The CPU 21 of the charger 1A controls the power feed/receive switcher 17 to connect the port 2 with the port 3. The CPU 21 starts supplying the electric power requested by the charger 1B from the electric power received from the AC adaptor 9 (S188). Then, the CPU 21 advances the process to S193. When the charged quantity of the rechargeable battery 10A has reached the target charge quantity (S193: YES), the CPU 21 transits the redetermination request to the charger 1B (S195), and terminates the upstream end equipment process.

When the request from the charger 1B is the swap request (S183: NO), the CPU 21 accepts the swap request (S190). The CPU 21 executes the swapping process with respect to the port 3. The CPU 21 controls the power feed/receive switcher 17 to connect the charge controller 15 with the port 3. In the charger 1B, the swapping process is executed, and the port 2 of the charger 1B and the discharge controller 16 are connected. The charger 1A and the charger 1B execute negotiation in accordance with the USB PD communication. The CPU 21 selects the charging electric power of the rechargeable battery 10A and the electric power satisfying the internal discharge electric power, and request the charger 1B for the same. The CPU 21 start charging the rechargeable battery 10A with the electric power of the charger 10B which the charger 1B supplies in accordance with the request (S191).

The CPU 21 controls the power feed/receive switcher 17 to connect the port 3 with the internal discharger 18A. The CPU 21 consumes the surplus electric power of the downstream rechargeable battery 10B by the discharger 18A in accordance with the consumption requested electric power (S192). Then, the CPU 21 advances the process to S193.

When the charged quantity of the rechargeable battery 10A has reached the target charge quantity (S193: YES), the CPU 21 transmits the redetermination request to the charger 1B, and terminates the upstream end equipment process.

Figure 12:
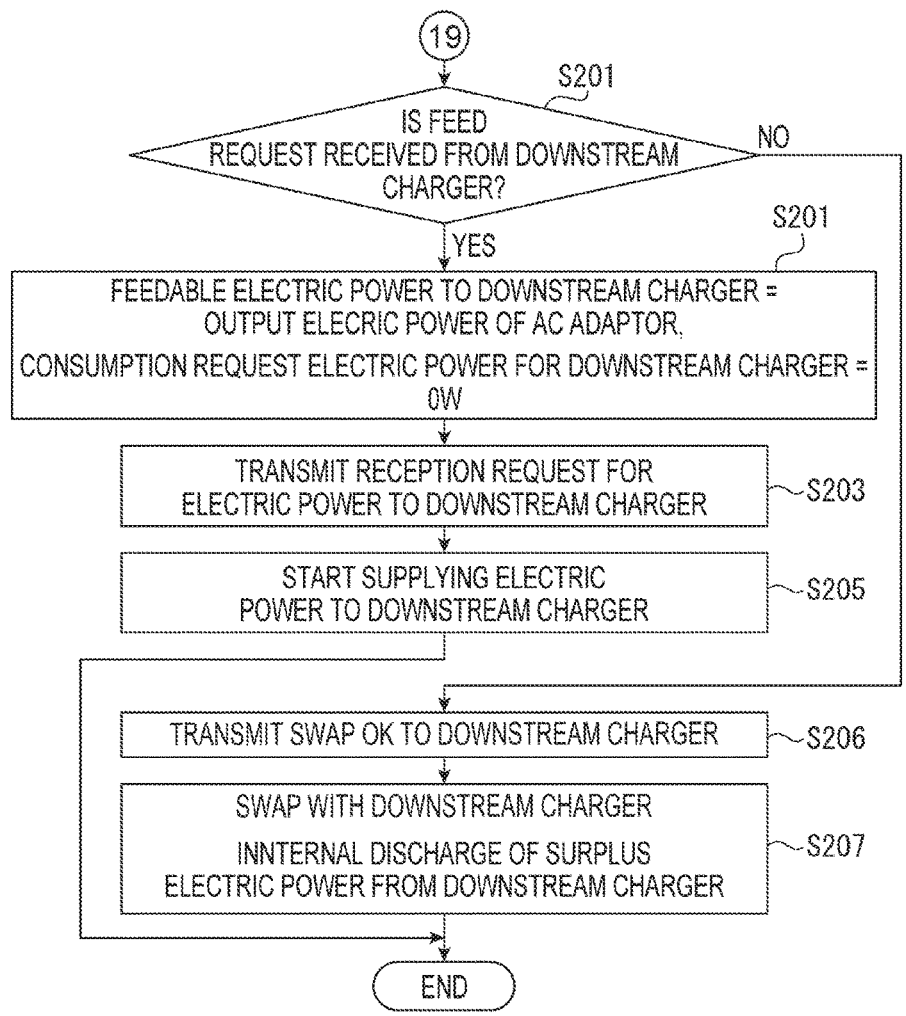

When the rechargeable battery 10A is not mounted on the charger 1A, and thus, the battery information is not stored in the RAM 23 (S171: NO), the CPU 21 advances the process to S201. Further, when it is determined that the charged quantity of the rechargeable battery 10A is equal to the target quantity (S172: NO; S182: NO), the CPU 21 also advances the process to S201. As shown in FIG. 12, the CPU 21 determines whether the request from the downstream charger 1B is the power reception request (S201). When it is determined that the power reception request is received from the downstream charger 1B (S201: YES), the CPU 21 calculates the feedable electric power to be supplied to the downstream charger 1B and the consumption requested electric power (S202). The CPU 21 sets the output electric power of the AC adaptor 9 to the feedable electric power, selects the USB PD profile corresponding to the feedable electric power, and sets the same to the power feed request. The CPU 21 determines that the consumption requested electric power with respect to the downstream charger 1B is 0 W, and sets the same to the power consumption request.

The CPU 21 transmits, to the charger 1B, the power feed request and the power consumption request (S203), and executes negotiation with the charger 1B in accordance with the USB PD communication. The CPU 21 of the charger 1B selects the electric power satisfying the charging electric power of the rechargeable battery 10B from the USB PD profile, and request the charger 1B for the same. Since the consumption requested electric power is 0 W, no internal discharging is executed in the charger 1B. The CPU 21 of the charger 1A controls the power feed/receive switcher 17 to connect the port 2 with the port 3. The CPU 21 starts supplying the electric power requested by the charger 1B from the AC adaptor 9 (S205), and terminates the upstream end equipment process.

When it is determined that the swap request is received from the charger 1B (S201: NO), the CPU 21 of the charger 1A accepts the swap request (S206). The CPU 21 controls the power feed/receive switcher 17 to connect the port 3 with the internal discharger 18A. The CPU 21 consumes the surplus electric power of the downstream rechargeable battery 10B by the internal discharger 18A (S207), and terminates the upstream end process.

In the stand-alone equipment process (FIG. 5: S15), when it is determined that the charged quantity of the rechargeable battery 10 is less than the target quantity, charging is executed with use of the output electric power of the AC adaptor 9. When it is determined that the charged quantity of the rechargeable battery 10 is greater than the target quantity, the surplus electric power of the rechargeable battery 10 is consumed by the discharger 18. When the charged quantity of the rechargeable battery 10 is equal to the target quantity, charging/discharging of the electric power of the rechargeable battery 10 is not executed.

As described above, the charger 1 is capable of charging the mounted rechargeable battery 10 with the electric power from the AC adapter 9, and further capable of discharging with use of the internal discharger 18. The charger 1 is configured such that multiple chargers 1 can be electrically connected in series via the cables 8, and the rechargeable battery mounted on the charger can be charged with use of the electric power of the rechargeable battery mounted on another charger 1. Further, the internal discharger 18 of the charger 1 is configured to discharge the surplus electric power of the rechargeable battery mounted on another charger 1. That is, the surplus electric power of the rechargeable battery can be discharged not only by the discharger 18 of the charger 1 on which the rechargeable battery 10 is mounted, but can be discharged by the discharger 18 of another charger 1 connected through the cable 8. Further, the charger 1 is configured such that, by efficiently redistributing the electric power of the rechargeable batteries 10 respectively mounted on the multiple chargers 1, which are connected in series, the discharging electric powers can be redistributed, and a discharging time period can be shortened.

The CPU 21 of the charger 1 is configured to transmit the power feed request, to another charger 1 which is connected on its upstream side or downstream side, when the charged quantity of the rechargeable battery 10 mounted thereon is greater than the target quantity, while transmit the power reception request when the charged quantity is less than the target quantity. With this configuration, the charger 1 is capable of charging the rechargeable battery 10 mounted thereon by receiving the electric power from the rechargeable battery mounted on another charger 1 preferentially in comparison with the electric power from the AC adaptor 9.

The charger 1A connected to the upstream end of the power supplying line is capable of executing one of a first process to a sixth process depending on the charged quantity of the rechargeable battery 10A mounted thereon. Therefore, the charger 1A is capable of setting the charging quantity of the rechargeable battery 10A to the target quantity efficiently.

The chargers 1B and 1C arranged at intermediate locations along the power supplying line are capable of executing one of the first process to the sixth process depending on the charged quantities of the rechargeable batteries 10B and 10C, respectively. Therefore, the chargers 1B and 1C are capable of setting the charging quantities of the rechargeable batteries 10B and 10C to the target quantity efficiently.

The charger 1D connected to the downstream end of the power supplying line is capable of executing one of the first process to the sixth process depending on the charged quantity of the rechargeable battery 10D mounted thereon. Therefore, the charger 1D is capable of setting the charging quantity of the rechargeable battery 10A to the target quantity efficiently.

It is noted that a process executed by the CPU 21 of the charger 1 to charge the rechargeable battery 10 mounted thereon with use of the output electric power of the AC adaptor 9 (e.g., S185, S97 or S47) is an example of the first process. A process executed by the CPU 21 of the charger 1 to charge the rechargeable battery 10 mounted thereon with use of the electric power of another rechargeable battery 10 (e.g., S191, S142 or S97, S47) is an example of the second process. Further, a process executed by the CPU 21 of the charger 1 to discharge the rechargeable battery 10 mounted thereon by the internal discharger 18 (e.g., S181, S80, S41) is an example of the third process. A process executed by the CPU 21 of the charger 1 to supply the electric power of the rechargeable battery 10 mounted thereon to another rechargeable battery 10 (e.g., S177, S67 or S77, S38) is an example of the fourth process. A process executed by the CPU 21 of the charger 1 to supply the electric power of the rechargeable battery 10 mounted thereon to another rechargeable battery 10 with consuming the electric power of the rechargeable battery 10 mounted thereon by the internal discharger 18 (e.g., S177 and S181, S66 and S80 or S77 and S80, S38 and S41) is an example of the fifth process. A process executed by the CPU 21 of the charger 1 to consume the electric power of the rechargeable battery 10 mounted on another charger 1 by the internal discharger 18 (e.g., S207, S131, S56) is an example of the sixth process.

The ports 2 and 3 follow the USB PD standard and have a high versatility. Therefore, even though the chargers 1A-1D have different specifications from each other, if programs compatible to the charge/discharge controlling process can be executed in the chargers 1A-1D, charging/discharging of the rechargeable batteries 10A-10D mounted on respective chargers 1A-1D can be executed efficiently, by connecting the chargers 1A-1D with the cables 8. Further, if the rechargeable batteries 10A-10D have different specifications, the chargers 1A-1D can charge the rechargeable batteries 10A-10D with appropriate charging electric powers in accordance with the USB PD profile, respectively.

It is noted that the aspects of the present disclosures should not be limited to the above-described illustrative embodiment, but can be modified in various ways. For example, the above-described charge/discharge controlling process needs not be limited to one executed by the CPU 21, but can be executed by another electric component such as ASIC, FPGA or the like. Further, according to the illustrative embodiment, the CPU 21 serves as a processor which execute the charge/discharge controlling process by developing a program stored in the ROM 22 on the RAM 23. As the CPU 21, a versatile processor may be used. Furthermore, a microcomputer, an ASIC, an FPGA or the like may be used instead of the CPU 21.

According to the illustrative embodiment, the cable 8 is capable of transmitting the electric power corresponding to the electric current of maximum 5 A. The aspects of the disclosures need not be limited to the above configuration. The cable 8 may correspond to the electric current of maximum 3 A. Further, according to the illustrative embodiment, the target quantity is se as a particular quantity (e.g., 30%) of the fully charged quantity. The target quantity may be modified to be defined by a range (e.g., 27%-33%) of the fully charged quantity.

When the charged quantity of the rechargeable battery 10 mounted on the charger 1 is greater than the target quantity, the CPU 21 mounting the rechargeable battery 10 thereon consumes the surplus electric power by the internal discharger 18 after transmitting the power feed request to another charger 1. This configuration could be modified such that the CPU 21 firstly starts consumption of the surplus electric power, and then transmits the power feed request to another charge 1 when the charged quantity of the rechargeable battery 10 is greater than the target quantity. According to such a configuration, discharge of the rechargeable battery 10 can be executed during execution of pre-processes for transmitting/receiving the electric power with respect to another charger 1, thereby the charged quantity of the rechargeable battery 10 being reduced to the target quantity quickly.

In the intermediate equipment process, the CPU 21 accepts the swap request received from the downstream charger 1 when the charged quantity of the rechargeable battery 10 mounted thereon is less than the target quantity. Aspects of the disclosures need not be limited to the above configuration. The CPU 21 may be configured, when the swap request is received from the downstream charger 1, to deny the swap request when the electric power can be supplied from the upstream charger 1, and accepts the swap request when the electric power cannot be supplied from the upstream charger 1.

According to the illustrative embodiment, the downstream charger 1 transmits the power reception request of the swap request to the upstream charger 1, and the upstream charger determines a process to be executed based on the received request. The above process is executed from the downstream end charger to the upstream end charger sequentially, thereby processes executed by all the chargers being determined. It is noted that the determination process need not be limited to the illustrative embodiment, and can be modified in various ways. For example, the upstream end charger 1 may collect information of the other chargers 1 and may determine the processes to be executed by all the chargers 1.

Figure 13A:
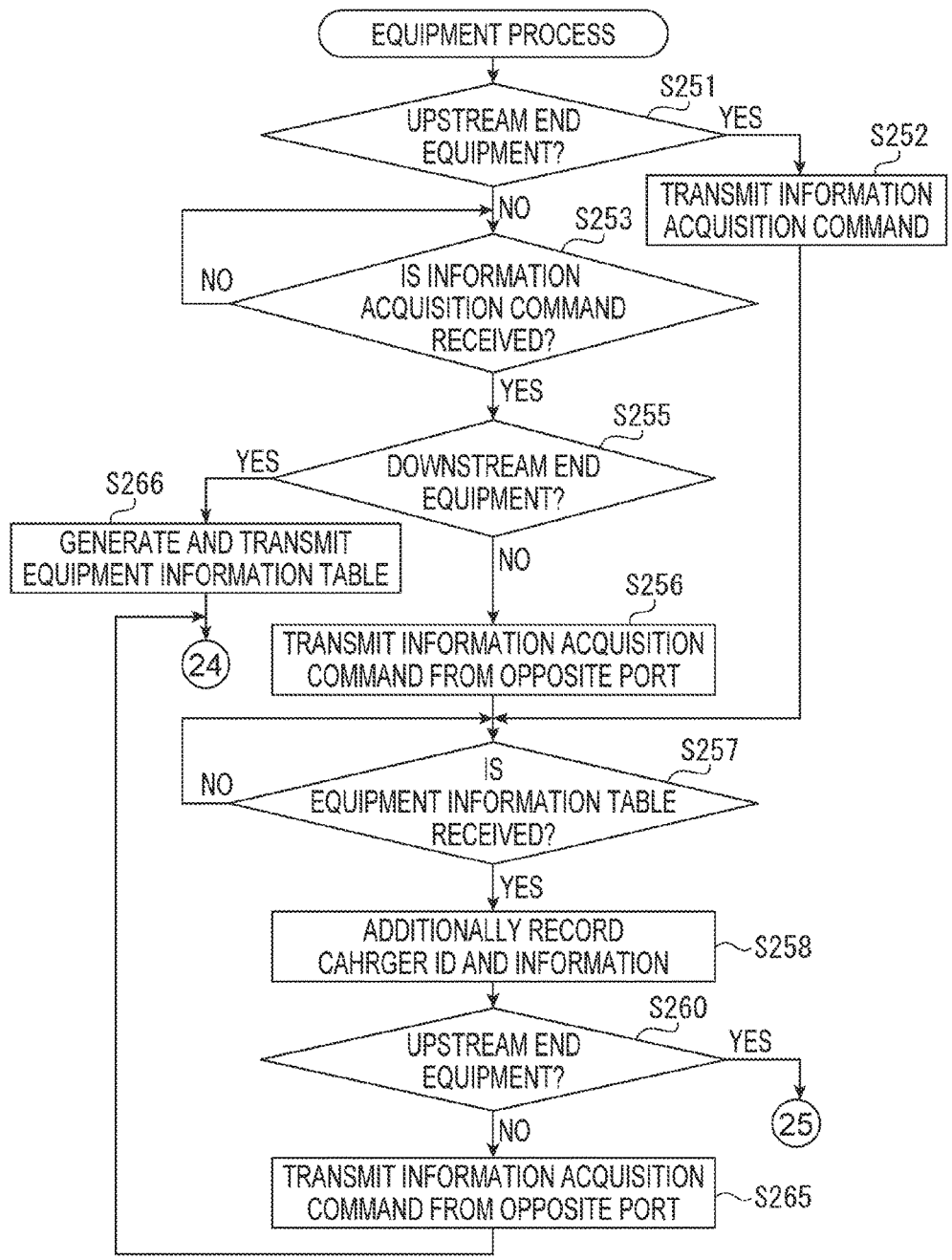
FIGS. 13A-13B show a flowchart illustrating an equipment process.
Figure 13B:
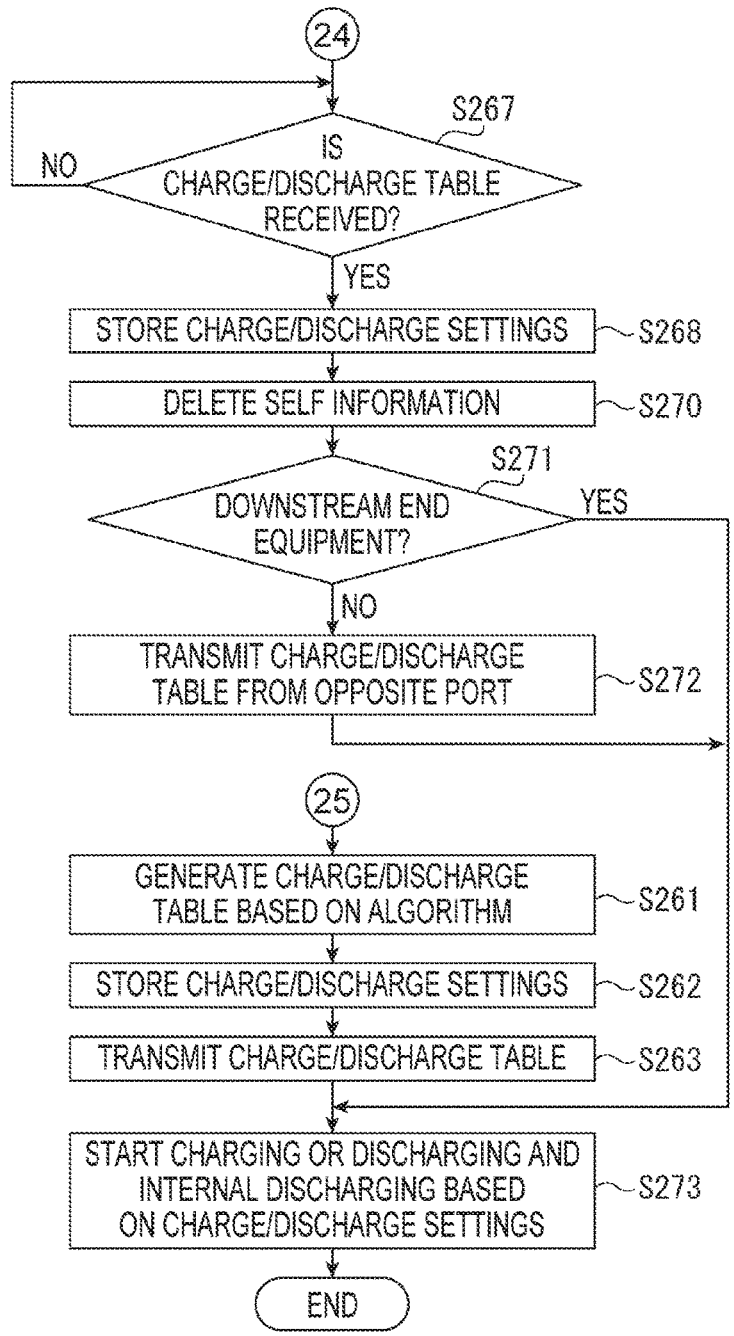

For example, in S11-S13 of the charge/discharge controlling process shown in FIGS. 5A and 5B, the CPU 21 may executes an equipment process shown in FIGS. 13A and 13B after determining whether the charger 1 is the upstream end equipment, the intermediate equipment or the downstream end equipment.

In the equipment process (see FIGS. 13A and 13B), the CPU 21 determines whether the charger 1 is the upstream end equipment (S251). When it is determined that the charger 1 is the upstream end equipment (S251: YES), the CPU 21 transmits information acquisition command to the charger 1B connected to the port 3 of the charger 1A (S252). Then, the CPU 21 awaits reception of equipment information table (S257: NO). When it is determined that the charger 1 is the intermediate equipment or the downstream end equipment (S251: NO), the CPU 21 awaits reception of the information acquisition command (S253: NO). When it is determined that the charger 1 is the intermediate equipment, in response to reception of the information acquisition command (S253: YES; S255: NO), the CPU 21 transmits the information acquisition command to the charger 1C or 1D connected to the port 3, which is opposite to the port 2 through which the information acquisition command is received (S256), and awaits reception of an equipment information table (S257: NO). According to the above process, the information acquisition command is propagated from the upstream end charger 1A to the downstream end charger 1D along the power supplying line.

Regarding the charger 1D which is the downstream end equipment, when the information acquisition command is received (S253: YES; S255: YES), the CPU 21 generates the equipment information table 50 (S266). As shown in FIG. 14A, the equipment table 50 contains information on the chargers and the rechargeable batteries 10 in association with the ID's of the chargers 1. The information on the chargers 1 and the rechargeable batteries 10 includes information regarding availability of each rechargeable battery (whether each rechargeable battery 10 is mounted on each charger 1), a capacity of each rechargeable battery 10, the target charge quantity for each rechargeable battery 10, the current charged quantity of each rechargeable battery 10, the internal discharge electric power of each internal discharger 18. The CPU 21 of the charger 1D stores information regarding the charger 1D and the rechargeable battery 10D in association with the ID of the charger 1D. As shown in FIGS. 13A and 13B, when the CPU 21 transmits the equipment information table 50 to the upstream charger 1C (S266), the CPU 21 awaits reception of a charge/discharge table (S267).

When the equipment information table 50 is received (S257: YES), the CPU 21 of the charger 1C additionally records the information regarding the charger 1C and the rechargeable battery 10C in association with the ID of the charger 1C in the equipment information table 50 (S258). Since the charger 1C is not the upstream end equipment (S260: NO), the CPU 21 transmits the equipment information table 50 to the charger 1B connected to the port 2, which is opposite to the port 3 through which the equipment information table 50 is received (S265), and awaits reception of the charge/discharge table (S267). Similarly, the CPU 21 of the charger 1B additionally records the information regarding the charger 1B and the rechargeable battery 10B in association with the ID of the charger 1B in the equipment information table 50, and transmits the equipment information table 50 to the charger 1A, and awaits reception of the charge/discharge table.

The CPU 21 of the charger 1A receives the equipment information table 50 and additionally records the information regarding the charger 1A and the rechargeable battery 10A in the equipment information table 50 in association with the ID of the charger 1A. Since the charger 1A is the upstream end equipment (S260: YES), the CPU 21 generate, according to a particular algorithm, the charge/discharge table 60 (S261). As shown in FIG. 14B, the charge/discharge table 60 contains the charge/discharge settings depending on the states of the charger 1 and the rechargeable battery 10, which are associated with the ID of the charger 1. The charge/discharge settings include settings of the charge/discharge status, ON/OFF status of the charge controller 15, the charger 1 mounting the rechargeable battery 10 subject to internal discharge by the internal discharger 18, ID of the charger 1 serves as the connection destination subject to feed/receive of the electric power. The particular algorithm is a program which patternizes a procedure to make the charge/discharge settings as in the first example—fourth example shown in FIGS. 3A-3D and 4A-4C, and detailed description will be omitted.

As shown in FIGS. 13A and 13B, the CPU 21 extracts the charge/discharge settings associated with the ID of the charger 1A from the charge/discharge table 60, stores the same in the RAM 23 (S262), and delete the same from the charge/discharge table 60. The CPU 21 transmits the charge/discharge table 60 to the downstream charger 1B (S263), and switches the connection states of the ports 2 and 3, the charge controller 15, the discharge controller 16 and the internal discharger 18 in accordance with the charge/discharge settings. The charge/discharge setting of the charger 1A is consuming of the electric power of the rechargeable battery 10A by the internal discharge 18A. The CPU 21 controls the discharge controller 16 to start discharging of the rechargeable battery 10A (S273). The CPU 21, then, terminates the equipment process.

When the charge/discharge table is received (S267: YES), the CPU 21 of the charger 1B extracts the charge/discharge setting associated with the ID of the charger 1B from the charge/discharge table 60, stores the same in the RAM 23 (S268), and delete the same from the charge/discharge table 60 (S270). Since the charger 1B is not the downstream end equipment (S271: NO), the CPU 21 of the charger 1B transmits the charge/discharge table 60 to the charger 1C connected to the port 3, which is opposite to the port 2 through which the charge/discharge table 60 was received (S272). Then, the CPU 21 switches the connection states of the ports 2 and 3, the charge controller 15, the discharge controller 16 and the internal discharger 18 in accordance with the charge/discharge settings. The charge/discharge setting of the charger 1B is consuming of the electric power of the rechargeable battery 10B by the internal discharge 18B. The CPU 21 controls the discharge controller 16 to start discharging of the rechargeable battery 10B (S273). The CPU 21, then, terminates the equipment process.

Similarly, when the CPU 21 of the charger 1C receives the charge/discharge table 60, the CPU 21 deletes the charge/ discharge settings of the charger 1C therefrom, and transmits the charge/discharge table 60 to the charger 1D. The CPU 21 of the charger 1C controls the power feed/receive switcher 17 in accordance with the charge/discharge settings of the charger 1C contained in the charge/discharge table 60. The charge/discharge settings of the charger 1C are to execute the swapping process between the charger 1C and the charger 1D, to charge the rechargeable battery 10C by receiving the electric power from the charger 1D, and to consume the electric power of the rechargeable battery 10D by the internal discharger 18C. The CPU 21 controls the charge controller 15 to start charging the rechargeable battery 10C (S273). Then, the CPU 21 terminates the equipment process.

The CPU 21 of the charger 1D controls the power feed/receive switcher 17 in accordance with the charge/discharge settings of the charger 1D contained in the charge/discharge table 60. Since the charger 1D is the downstream end equipment, the CPU 21 does not retransmit the charge/discharge table 60 to anywhere (S271: YES, S273). The charge/discharge settings of the charger 1D are to execute the swapping process between the charger 1D and the charger 1C, to discharge the rechargeable battery 10D by supplying the electric power to the charger 1C, to consume the electric power of the rechargeable battery 10D by the internal discharger 18D and the discharger 18C of the charger 1C. The CPU 21 controls the discharge controller 16 to start discharging the rechargeable battery 10D (S273). Then, the CPU 21 terminates the equipment process.

As described above, the upstream end charger 1A may collect information on the chargers 1A-1D and the rechargeable batteries 10A-10D from the other chargers 1B-1D by means of the equipment information table 50, and execute the charge/discharge settings for respective chargers 1A-1D. Since the chargers 1A-1D additionally record information thereon in the equipment information table 50, the data amount of the equipment information table 50 can be smaller for the charger 1 located closer to the downstream end side. The CPU 21 of the charger 1A can unitary manage the electric powers of the rechargeable batteries 10A-10D respectively mounted on the multiple chargers 1A-1D which are connected in series and redistributed the electric powers efficiently. Therefore, the electric powers to be discharge can be reused efficiently, and the time period for discharging the rechargeable batteries can be shortened.

It is noted that the CPU 21 executing S3 is an example of an acquisition part. The AC adaptor 9 is an example of a power source. The CPU 21 executing S32, S42, S62, S92, S172 and S182 is an example of a comparator. The ID of the charger 1 is an example of an identifier.

What is claimed is:
1. A charger, comprising:
a mounting part configured to mount a rechargeable battery;
an acquisition part configured to acquire a charged quantity of the rechargeable battery mounted on the mounting part;
a port part to which cables transmitting electric power are connectable;
a switcher configured to switch transmission status of the electric power through the cables;
a discharger configured to consume the electric power by discharging; and
a controller configured to control the switcher and the discharger based on the charged quantity acquired by the acquisition part, the charger being configured such that multiple chargers can be connected in series through the cables, the cables including a first cable and a second cable,
the port part including an upstream port and a downstream port, the upstream port being connectable with a power source or an upstream charger which is another charger of the multiple chargers arranged on a power source side through the first cable, the downstream port being connectable with a downstream charger which is another charger of the multiple chargers arranged on a side farther from the power source through the second cable,
the cables being configured to transmit the electric power, the cables being further configured to transmit information among controllers of respective ones of the multiple chargers,
the information including request information for feed/reception of the electric power with respect to the rechargeable battery depending on the charged quantity of the rechargeable battery,
wherein the controller is configured to control, depending on the charged quantity of the rechargeable battery and the request information, the switcher and the discharger to execute one of:
at least one of charging the rechargeable battery with the electric power received from one of the power source, the upstream charger and the downstream charger through the corresponding one of the first cable and the second cable, and consuming the electric power as received by the discharger; and
at least one of transmitting the electric power of the rechargeable battery to one of the upstream charger and the downstream charger through the corresponding one of the first cable or the second cable, and consuming the electric power of the rechargeable battery by the discharger.
2. The charger according to claim 1,
wherein the controller includes a comparator configured to compare the charged quantity of the rechargeable battery and a target quantity,
wherein the request information includes a power reception request and a power feed request, the power reception request requesting reception of the electric power when the charged quantity of the rechargeable battery is less than the target quantity, the power feed request requesting feeding of the electric power when the charged quantity of the rechargeable battery is greater than the target quantity,
wherein the controller is configured to transmit one of the power reception request and the power feed request to at least one of the upstream charger and the downstream charger based on a comparison result of the comparator.
3. The charger according to claim 2, wherein, when the power source is connected to the upstream port and the downstream charger is connected to the downstream port, the controller controls, based on the comparison result of the comparator and the request information received from the downstream charger, the switcher and the discharger to execute one of:
a first process of charging the rechargeable battery with the electric power supplied from the power source when the charged quantity of the rechargeable battery is less than the target quantity;
a second process of charging the rechargeable battery with the electric power supplied from another rechargeable battery mounted on the downstream charger when the charged quantity of the rechargeable battery is less than the target quantity;

a third process of consuming the electric power of the rechargeable battery by the discharger when the charged quantity of the rechargeable battery is greater than the target quantity;

a fourth process of transmitting the electric power of the rechargeable battery to the downstream charger when the charged quantity of the rechargeable battery is greater than the target quantity;

a fifth process of transmitting the electric power of the rechargeable battery to the downstream charger and consuming the electric power of the rechargeable battery by the discharger when the charged quantity of the rechargeable battery is greater than the target quantity; and a sixth process of consuming the electric power supplied from another charger mounted on the downstream charger by the discharger when the charged quantity of the rechargeable battery is equal to the target quantity.

4. The charger according to claim 2, wherein, when the upstream charger is connected to the upstream port and the downstream charger is connected to the downstream port, the controller controls, based on the comparison result of the comparator and the request information received from the upstream charger and the downstream charger, the switcher and the discharger to execute one of:

a first process of charging the rechargeable battery with the electric power supplied from the power source when the charged quantity of the rechargeable battery is less than the target quantity;

a second process of charging the rechargeable battery with the electric power supplied from another rechargeable battery mounted on one of the upstream charger and the downstream charger when the charged quantity of the rechargeable battery is less than the target quantity;

a third process of consuming the electric power of the rechargeable battery by the discharger when the charged quantity of the rechargeable battery is greater than the target quantity;

a fourth process of transmitting the electric power of the rechargeable battery to one of the upstream charger and the downstream charger when the charged quantity of the rechargeable battery is greater than the target quantity;

a fifth process of transmitting the electric power of the rechargeable battery to one of the upstream charger and the downstream charger and consuming the electric power of the rechargeable battery by the discharger when the charged quantity of the rechargeable battery is greater than the target quantity; and a sixth process of consuming the electric power supplied from another charger mounted on one of the upstream charger and the downstream charger by the discharger when the charged quantity of the rechargeable battery is equal to the target quantity.

5. The charger according to claim 2, wherein, when only the upstream port is connected with the upstream charger, the controller controls, based on the comparison result of the comparator and the request information received from the downstream charger, the switcher and the discharger to execute one of:

a first process of charging the rechargeable battery with the electric power supplied from the power source when the charged quantity of the rechargeable battery is less than the target quantity;

a second process of charging the rechargeable battery with the electric power supplied from another rechargeable battery mounted on the upstream charger when the charged quantity of the rechargeable battery is less than the target quantity;

a third process of consuming the electric power of the rechargeable battery by the discharger when the charged quantity of the rechargeable battery is greater than the target quantity;

a fourth process of transmitting the electric power of the rechargeable battery to the upstream charger when the charged quantity of the rechargeable battery is greater than the target quantity;

a fifth process of transmitting the electric power of the rechargeable battery to the upstream charger and consuming the electric power of the rechargeable battery by the discharger when the charged quantity of the rechargeable battery is greater than the target quantity; and a sixth process of consuming the electric power supplied from another charger mounted on the upstream charger by the discharger when the charged quantity of the rechargeable battery is equal to the target quantity.

6. The charger according to claim 2, wherein the controller is configured to assign an identifier to the request information when transmitting the request information.

7. The charger according to claim 1, wherein the port part is provided with an interface based on the USB Power Delivery standard.

8. A charge control method of controlling a charger, the charger having a mounting part configured to mount a rechargeable battery, an acquisition part configured to acquire a charged quantity of the rechargeable battery mounted on the mounting part, a port part to which cables transmitting electric power are connectable, a switcher configured to switch transmission status of the electric power through the cables, a discharger configured to consume the electric power by discharging, and a controller configured to control the switcher and the discharger based on the charged quantity acquired by the acquisition part, the charger being configured such that multiple chargers can be connected in series through the cables which include a first cable and a second cable, the port part including an upstream port and a downstream port, the upstream port being connectable with a power source or an upstream charger which is another charger of the multiple chargers arranged on a power source side through the first cable, the downstream port being connectable with a downstream charger which is another charger of the multiple chargers arranged on a side farther from the power source through the second cable, the cables being configured to transmit the electric power, the cables being further configured to transmit information among controllers of respective ones of the multiple chargers, the information including request information for feed/reception of the electric power with respect to the rechargeable battery depending on the charged quantity of the rechargeable battery, the method causing the controller to control, depending on the charged quantity of the rechargeable battery and the request information, the switcher and the discharger to execute one of:

at least one of charging the rechargeable battery with the electric power received from one of the power source, the upstream charger and the downstream charger through the corresponding one of the first cable or the second cable, and consuming the electric power as received by the discharger; and at least one of transmitting the electric power of the rechargeable battery to one of the upstream charger and the downstream charger through the corresponding one of the first cable or the second cable, and consuming the electric power of the rechargeable battery by the discharger.

9. The charge control method according to claim 8, wherein the request information includes a power reception request and a power feed request, the power reception request requesting reception of the electric power when the charged quantity of the rechargeable battery is less than a target quantity, the power feed request requesting feeding of the electric power when the charged quantity of the rechargeable battery is greater than the target quantity, the method further comprises:
    causing the controller to compare the charged quantity of the rechargeable battery with the target quantity; and
    causing the controller to transmit one of the power reception request and the power feed request to at least one of the upstream charger and the downstream charger based on a comparison result.

10. The charge control method according to claim 9, wherein when the power source is connected to the upstream port and the downstream charger is connected to the downstream port, causing the controller to control, based on the comparison result and the request information received from the downstream charger, the switcher and the discharger to execute one of:
    a first process of charging the rechargeable battery with the electric power supplied from the power source when the charged quantity of the rechargeable battery is less than the target quantity;
    a second process of charging the rechargeable battery with the electric power supplied from another rechargeable battery mounted on the downstream charger when the charged quantity of the rechargeable battery is less than the target quantity;
    a third process of consuming the electric power of the rechargeable battery by the discharger when the charged quantity of the rechargeable battery is greater than the target quantity;
    a fourth process of transmitting the electric power of the rechargeable battery to the downstream charger when the charged quantity of the rechargeable battery is greater than the target quantity;
    a fifth process of transmitting the electric power of the rechargeable battery to the downstream charger and consuming the electric power of the rechargeable battery by the discharger when the charged quantity of the rechargeable battery is greater than the target quantity; and
    a sixth process of consuming the electric power supplied from another charger mounted on the downstream charger by the discharger when the charged quantity of the rechargeable battery is equal to the target quantity.

11. The charge control method according to claim 9, wherein when the upstream charger is connected to the upstream port and the downstream charger is connected to the downstream port, causing the controller to control, based on the comparison result and the request information received from the upstream charger and the downstream charger, the switcher and the discharger to execute one of:
    a first process of charging the rechargeable battery with the electric power supplied from the power source when the charged quantity of the rechargeable battery is less than the target quantity;
    a second process of charging the rechargeable battery with the electric power supplied from another rechargeable battery mounted on one of the upstream charger and the downstream charger when the charged quantity of the rechargeable battery is less than the target quantity;
    a third process of consuming the electric power of the rechargeable battery by the discharger when the charged quantity of the rechargeable battery is greater than the target quantity;
    a fourth process of transmitting the electric power of the rechargeable battery to one of the upstream charger and the downstream charger when the charged quantity of the rechargeable battery is greater than the target quantity;
    a fifth process of transmitting the electric power of the rechargeable battery to one of the upstream charger and the downstream charger and consuming the electric power of the rechargeable battery by the discharger when the charged quantity of the rechargeable battery is greater than the target quantity; and
    a sixth process of consuming the electric power supplied from another charger mounted on one of the upstream charger and the downstream charger by the discharger when the charged quantity of the rechargeable battery is equal to the target quantity.

12. The charge control method according to claim 9, wherein when only the upstream port is connected with the upstream charger, causing the controller to control, based on the comparison result and the request information received from the downstream charger, the switcher and the discharger to execute one of:
    a first process of charging the rechargeable battery with the electric power supplied from the power source when the charged quantity of the rechargeable battery is less than the target quantity;
    a second process of charging the rechargeable battery with the electric power supplied from another rechargeable battery mounted on the upstream charger when the charged quantity of the rechargeable battery is less than the target quantity;
    a third process of consuming the electric power of the rechargeable battery by the discharger when the charged quantity of the rechargeable battery is greater than the target quantity;
    a fourth process of transmitting the electric power of the rechargeable battery to the upstream charger when the charged quantity of the rechargeable battery is greater than the target quantity;
    a fifth process of transmitting the electric power of the rechargeable battery to the upstream charger and consuming the electric power of the rechargeable battery by the discharger when the charged quantity of the rechargeable battery is greater than the target quantity; and
    a sixth process of consuming the electric power supplied from another charger mounted on the upstream charger by the discharger when the charged quantity of the rechargeable battery is equal to the target quantity.

13. The charge control method according to claim 9, causing the controller to assign an identifier to the request information when transmitting the request information.

14. The charge control method according to claim 8, wherein the port part is provided with an interface based on the USB Power Delivery standard.

* * * * *